United States Patent
Sevostianov

(10) Patent No.: US 10,481,679 B2
(45) Date of Patent: Nov. 19, 2019

(54) METHOD AND SYSTEM FOR OPTICAL-INERTIAL TRACKING OF A MOVING OBJECT

(71) Applicant: ALT LLC, Moscow (RU)

(72) Inventor: Petr Vyacheslavovich Sevostianov, Voronezh (RU)

(73) Assignee: ALT LLC, Moscow (RU)

( * ) Notice: Subject to any disclaimer, the term of this patent is extended or adjusted under 35 U.S.C. 154(b) by 0 days.

(21) Appl. No.: 15/844,967

(22) Filed: Dec. 18, 2017

(65) Prior Publication Data

US 2019/0187783 A1  Jun. 20, 2019

(51) Int. Cl.
| | |
|---|---|
| *G06F 3/01* | (2006.01) |
| *G06T 19/00* | (2011.01) |
| *A63F 13/211* | (2014.01) |
| *A63F 13/213* | (2014.01) |
| *G09B 9/00* | (2006.01) |
| *A63F 13/44* | (2014.01) |
| *A63F 13/235* | (2014.01) |
| *A63F 13/53* | (2014.01) |

(52) U.S. Cl.
CPC ............ *G06F 3/012* (2013.01); *A63F 13/211* (2014.09); *A63F 13/213* (2014.09); *A63F 13/235* (2014.09); *A63F 13/44* (2014.09); *A63F 13/53* (2014.09); *G06T 19/006* (2013.01); *G09B 9/00* (2013.01); *A63F 2300/8082* (2013.01)

(58) Field of Classification Search
None
See application file for complete search history.

(56) References Cited

U.S. PATENT DOCUMENTS

| | | | |
|---|---|---|---|
| 2006/0146046 A1 | 7/2006 | Longhurst et al. | |
| 2013/0064427 A1* | 3/2013 | Picard | G01S 5/163 382/103 |
| 2013/0127980 A1 | 5/2013 | Haddick et al. | |
| 2014/0062881 A1 | 3/2014 | Solomon et al. | |
| 2016/0252965 A1* | 9/2016 | Mandella | G01B 21/04 345/156 |
| 2017/0011555 A1* | 1/2017 | Li | G06T 1/60 |
| 2017/0018121 A1 | 1/2017 | Lawson et al. | |
| 2017/0300834 A1* | 10/2017 | Ishida | G06Q 30/0284 |
| 2018/0122136 A1* | 5/2018 | Lynen | G01C 17/38 |

OTHER PUBLICATIONS

Search report in PCT/IB2017/058068, dated Oct. 11, 2018.

* cited by examiner

*Primary Examiner* — YuJang Tswei
(74) *Attorney, Agent, or Firm* — Bardmesser Law Group

(57) ABSTRACT

Method for inside-out optical-inertial tracking of a movable object includes providing IR light by a plurality of markers; reading a picture from an optical sensor and detecting pixels satisfying predefined conditions by a first data processing device; detecting marker blobs, based on the pixels, and determining parameters of the blobs by the first data processing device; reading data from an inertial sensor; generating a consolidated data flow comprising the parameters of the marker blobs and the data of the inertial sensor by the first data processing device, and transmitting the data flow to a second communication device; determining a tracker positioning data in a coordinate system of a motion area of the object, based on the consolidated data flow, by a second data processing device; validating a model of a tracker motion path, based on tracker positioning data; extrapolating tracker positioning data onto an extrapolation horizon, based on the model.

77 Claims, 20 Drawing Sheets

METHOD AND SYSTEM FOR OPTICAL-INERTIAL TRACKING OF A MOVING OBJECT

BACKGROUND OF THE INVENTION

Field of the Invention

The invention relates to a method and a system for inside-out optical-inertial tracking a movable object and it may be used in virtual reality or augmented reality systems, internal logistics systems (including factory logistics, warehouse logistics or store logistics), robotics systems, unmanned movable objects and other types of industrial, scientific or training systems.

Description of the Related Art

Tracking a movable object in a virtual reality (VR) system or in an augmented reality (AR) system means tracking position and orientation of a movable object, which are used for rendering an image displayed to a user of the system.

A tracking system may be configured either as an outside-in tracking system, where a sensor or multiple sensors is (are) located in an area outside a tracked object and a reference point or multiple reference points is (are) located on the tracked object, or an inside-out tracking system, where a sensor or multiple sensors is (are) located on a tracked object and a reference point or multiple reference points is (are) located in an area outside the tracked object.

As for sensor types, there is optical tracking, where optical sensors are used, e.g., cameras operating in visible light or infrared light range, and inertial tracking, where inertial sensors are used, e.g., gyroscopes and accelerometers. Moreover, magnetic field sensors (magnetometers), sensors of height above the sea level (altimeters) and some other sensor types may also be used in tracking systems.

There are tracking systems using centralized positioning systems, which may be local or global, satellite-based or terrestrial ones.

Most of tracking systems intended for use in gaming, entertainment and training VR/AR systems are combined tracking systems. In particular, optical-inertial tracking systems are widely used, which are based on combined application of optical and inertial sensors, where the sensors complement each other and mutually compensate for each other's drawbacks.

There are tracking systems implementing an inside-out optical-inertial tracking approach, where a video camera is located on a movable object and optical light-emitting or retroreflective markers used as reference points for optical tracking are fixedly installed on a site or in a territory of the system operational area in a predefined manner A gyroscope and an accelerometer are also located on the movable object and data acquired form these sensors is used for determination of position, orientation, velocity and direction of movement, acceleration and other parameters of the tracked object, along with data acquired form the video camera. Data extrapolation is employed for prediction of the above-indicated parameters, so as to compensate algorithm-dependent and hardware-dependent delays.

U.S. Pat. No. 9,352,230 discloses an outside-in optical-inertial tracking system, where camera, gyroscope and accelerometer data is used and data extrapolation is employed for prediction of parameters of a movable object. A drawback of this system is the need for application of multiple fixed cameras for covering the whole operational area providing enough room for gaming, entertainment and training VR/AR systems. A possibility of implementation of an inside-out optical-inertial tracking approach is mentioned in the document; however, technical details of such an implementation are not disclosed.

US Patent Publication No. 2017177937 discloses an inside-out optical-inertial tracking system, where camera, gyroscope and accelerometer data is used and data extrapolation is employed for prediction of parameters of a movable object. This system does not employ markers installed on a site or in a territory of the system operational area in a predefined manner and used as reference points for optical tracking. Using feature points of architectural or natural environment as reference points increases requirements for computational capability of the system and when the computational resources are limited, this approach inevitably causes a decrease in the system operation speed.

US Patent Publication No. 2008300055 discloses an outside-in optical-inertial tracking system, where camera, gyroscope and accelerometer data is used and data extrapolation is employed for prediction of parameters of a movable object. A drawback of this system is the need for application of multiple fixed cameras for covering the whole operational area and providing enough room for gaming, entertainment and training VR/AR systems. A possibility of implementation of an inside-out optical-inertial tracking approach is mentioned in the document, wherein, where the tracking camera is located in a bangle; however, technical details of this implementation option are not disclosed.

US Patent Publication No. 2016232715 discloses an outside-in optical-inertial tracking system, where camera, gyroscope and accelerometer data is used and data extrapolation is employed for prediction of parameters of a movable object. A drawback of this system is a need for application of multiple fixed cameras for covering the whole operational area providing enough room for gaming, entertainment and training VR/AR systems. A possibility of implementation of an inside-out optical-inertial tracking approach is mentioned in the document, where the tracking camera is located in a mobile device; however, technical details of this implementation option are not disclosed.

US Patent Publication No. 2012105473 discloses an outside-in optical-inertial tracking system, where data acquired from camera, gyroscope and accelerometer located in a helmet display is used and data extrapolation is employed for prediction of parameters of a movable object. This system does not employ active markers; this feature increases requirements for computational capability of the system and when the computational resources are limited, this approach inevitably causes a decrease in the system operation speed.

US Patent Publication No. 2015029218 discloses an outside-in optical-inertial tracking system, where data acquired from camera, gyroscope and accelerometer located in a helmet display is used and data extrapolation is employed for prediction of parameters of a movable object. This system does not employ active markers, thus requirements for computational capability of the system are increased and when the computational resources are limited, this approach inevitably causes a decrease in the system operation speed.

Patent Publication WO2014210342 discloses an outside-in optical-inertial tracking system, where data acquired from camera, gyroscope and accelerometer located in a helmet-mounted display is used and data extrapolation is employed for prediction of parameters of a movable object. This system does not employ active markers; this feature increases requirements for computational capability of the system and when the computational resources are limited, this approach inevitably causes decrease in the system operation speed.

US Patent Publication No. 2014354515 discloses an outside-in optical-inertial tracking system, where camera, gyroscope and accelerometer data is used and data extrapolation is employed for prediction of parameters of a movable object. A drawback of this system is necessity of application of multiple fixed cameras for covering the whole operational area providing enough room for gaming, entertainment and training VR/AR systems. A possibility of implementation of an inside-out optical-inertial tracking approach is mentioned in the document, where the tracking camera is located in a helmet-mounted display; however, technical details of such an implementation are not disclosed.

US Patent Publication No. 2017185171 discloses an outside-in optical-inertial tracking system, where camera, gyroscope and accelerometer data is used and data extrapolation is employed for prediction of parameters of a movable object. A drawback of this system is necessity of application of multiple fixed cameras for covering the whole operational area providing enough room for gaming, entertainment and training VR/AR systems. A possibility of implementation of an inside-out optical-inertial tracking approach is mentioned in the document, where the tracking camera is located in close proximity to a user; however, technical details of this implementation option are not disclosed.

US Patent Publication No. 2017018121 discloses an outside-in optical-inertial tracking system, where camera, gyroscope and accelerometer data is used and data extrapolation is employed for prediction of parameters of a movable object. A drawback of this system is a need for application of multiple fixed cameras for covering the whole operational area providing enough room for gaming, entertainment and training VR/AR systems. A possibility of implementation of an inside-out optical-inertial tracking approach is mentioned in the document, where the tracking camera is located in close proximity to a user; however, technical details of this implementation option are not disclosed.

US Patent Publication No. 2014062881 discloses an outside-in optical-inertial tracking system, where data acquired from camera, gyroscope and accelerometer located in a helmet-mounted display is used and data extrapolation is employed for prediction of parameters of a movable object. This system does not employ active markers, thus requirements for computational capability of the system are increased and when the computational resources are limited, this approach inevitably causes decrease in the system operation speed.

Non-patent document Hogue et al. [1] discloses an inside-out optical-inertial tracking system, where data acquired from camera, gyroscope and accelerometer located in a helmet-mounted display is used and data extrapolation is employed for prediction of parameters of a movable object. Images formed on walls by a laser beam projection are used as reference points for optical tracking instead of active markers; this feature increases requirements for computational capability of the system and when the computational resources are limited, this approach inevitably causes decrease in the system operation speed.

Non-patent document Wormell et al. [2] discloses an inside-out optical-inertial tracking system, where data acquired from camera, gyroscope and accelerometer located in a helmet-mounted display is used and data extrapolation is employed for prediction of parameters of a movable object. Images applied to walls are used as reference points for optical tracking, instead of active markers; this feature increases requirements for computational capability of the system and when the computational resources are limited, this approach inevitably causes decrease in the system operation speed.

Non-patent documents Atac et al. [3, 4] disclose an inside-out optical-inertial tracking system, where data acquired from camera, gyroscope and accelerometer located in a helmet-mounted display is used and data extrapolation is employed for prediction of parameters of a movable object. Barcodes applied to walls are used as reference points for optical tracking instead of active markers; this feature increases requirements for computational capability of the system, and when the computational resources are limited, this approach inevitably causes a decrease in the system operation speed.

A combination of inside-out optical tracking and inertial tracking for implementation of a mobile AR system is discussed in a non-patent document Pinz et al. [5]; however, this discussion is mostly theoretical.

Using optical sensor data for correction of inertial sensor data in an optical-inertial tracking system is discussed in a non-patent document You et al. [6]; however, this discussion is mostly theoretical.

Non-patent document Miezal et al. [7] discloses an inside-out optical-inertial tracking system for tracing position of the user's head, using a single passive marker located in a visibility range of a camera; such an approach limits application of this solution to those options, where the user is relatively sedentary, so its implementation in gaming, entertainment and training VR/AR systems is not expedient.

Therefore, there is a need for a fast, reliable, precise and relatively cheap method of tracking a user in VR/AR systems, where the user's limbs may jerk and the user's body may move fast in a rather wide operational area, whose size may range from several square meters (in single-user systems) to several tens of square meters or even to several hundreds of square meters (in multi-user systems).

Similar tasks related to tracking a movable object are relevant for other fields, in particular, for internal logistics systems (including factory logistics, warehouse logistics or store logistics), robotics systems, unmanned vehicles and other types of industrial, scientific or training systems.

SUMMARY OF THE INVENTION

One object is to solve problem of fast, reliable, precise and relatively cheap tracking a movable object in different systems, in particular, in VR/AR systems, but not limited to them.

This objective is achieved by a first aspect of the invention, which is a method of optical-inertial tracking a movable object, the method including the following steps:
(a) providing emission of IR light by a plurality of markers;
(b) reading a picture from an optical sensor physically connected to the movable object and detecting pixels satisfying predefined conditions in the read picture by a first data processing device;
(c) detecting marker blobs, based on the detected pixels, and determining parameters of the marker blobs by the first data processing device;
(d) reading data from at least one inertial sensor physically connected to the movable object by the first data processing device;
(e) generating a consolidated data flow comprising the parameters of the marker blobs and the data of the at least one inertial sensor by the first data processing device, and transmitting the consolidated data flow by a first communication device to a second communication device;

(f) receiving the consolidated data flow by the second communication device and determining a tracker positioning data in a coordinate system of a motion area of the movable object, based on the consolidated data flow, by the second data processing device;

(g) validating a mathematical model of a tracker motion path, based on the tracker positioning data, by the second data processing device;

(h) extrapolating the tracker positioning data onto an extrapolation horizon, based on the validated mathematical model of the tracker motion path, by the second data processing device.

In this method, the picture from the optical sensor in step (b) may be read from a portion of the optical sensor, which size is less than a whole frame size of the optical sensor.

In this method, the optical sensor portion to be read may be a tracing window.

In this method, the predefined conditions in step (b) may include a threshold value of brightness of the pixel.

In this method, the predefined conditions may include a requirement related to aggregation of the pixels.

In this method, detecting pixels satisfying the predefined conditions in step (b) may start before end of reading the picture from the optical sensor.

In this method, step (b) may be performed by an FPGA.

In this method, the parameters of each of the marker blobs in step (c) may include coordinates of its center in a coordinate system of a frame of the optical sensor, an effective radius and a weighted brightness.

In this method, the coordinates of the marker center may be determined with a subpixel accuracy.

In this method, the parameters of the marker blob may include a timestamp indicating a time point, when an appropriate frame was captured.

In this method, step (c) may be performed by a microcontroller.

In this method, the inertial sensor in step (d) may be a gyroscope.

In this method, the inertial sensor in step (d) may be an accelerometer.

In this method, the data read from the inertial sensor in step (d) may include a timestamp indicating a time point when the data was read.

In this method, the consolidated data flow generated in step (e) may include data of multiple trackers.

In this method, the consolidated data flow in step (f) may be divided into multiple consolidated data flows, whose number corresponds to a number of the trackers.

In this method, the first data processing device and the first communication device may be located in the tracker, and the second data processing device and the second communication device may be located in a host.

In this method, the tracker may be combined with the host.

In this method, identification of the markers may be performed, based on the parameters of the marker blobs, so as to determine the tracker positioning data in step (f).

In this method, the identification of the markers may be performed using a predefined optical pattern.

In this method, the optical pattern may be a linear optical pattern.

In this method, the linear optical pattern may include blobs corresponding to a group of three markers aligned in a line, where a distance between a first marker and a second marker is twice as much as a distance between the second marker and a third marker.

In this method, a set of historic tracking data may be generated, based on the tracker positioning data determined in step (f) for different time points.

In this method, the validation of the mathematical model of the tracker motion path in step (g) may be performed, using the set of historic tracking data.

In this method, the set of historic tracking data may include a set of data S, comprising a multi-dimensional vector characterizing position, orientation and (optionally) motion parameters of the tracker, and a set of data L, comprising data of one or more inertial sensors.

In this method, the set of historic tracking data may include a set of data OF, comprising information on rays in a local coordinate system of the tracker, the rays directed to the markers, which blobs were detected in step (c).

In this method, the validation of the mathematical model of the tracker motion path in step (g) may include calculating the data S in a backward direction through the entire depth of the historic tracking data, optimizing the data S in an earliest time point of the history, and then calculating an optimized data S in a forward direction through the entire depth of the historic tracking data.

In this method, a vector E of the tracker positioning error may be calculated, which is determined by comparison of the marker coordinates calculated, based on the data OF and predetermined actual marker coordinates, in a backward direction through the entire depth of the historic tracking data, and the optimization of the data S in the earliest time point of the history may be performed, using the vector E of the tracker positioning error.

In this method, the marker coordinates calculated, based on the data OF, may be polar coordinates.

In this method, the optimization of the data S in the earliest time point of the history may be performed, using a least squares method.

In this method, the optimization of the data S in the earliest time point of the history may be performed, using a Levenberg-Marquardt algorithm.

In this method, the vector E of the tracker positioning error may be calculated in a forward direction through the entire depth of the historic tracking data, and the validation of the mathematical model of the tracker motion path may be performed by comparing the vectors E of the tracker positioning error calculated in the forward direction and the vectors E of the tracker positioning error calculated in the backward direction, and by calculating a target function, which value is used for judging validity of the mathematical model of the tracker motion path.

In this method, the target function may be a weighting function.

In this method, a result of the validation of the mathematical model of the tracker motion path may be an optimized data S, which ensures minimal error of the tracker positioning.

In this method, the determination of the tracker positioning data in step (f) may be performed each time, when new data of the at least one inertial sensor is received in the consolidated data flow.

In this method, the validation of the mathematical model of the tracker motion path in step (g) may be performed each time, when new parameters of the marker blobs are received in the consolidated data flow.

In this method, the extrapolation of the tracker positioning data in step (h) may be performed by defining an extrapolation horizon, defining an extrapolation base, and by extrapolating the tracker motion path onto the extrapolation horizon.

In this method, the extrapolation horizon may be defined, based on data received from a 3D-engine, which provides rendering a 3D-scene.

This method may additionally include a step of rendering a 3D-scene, based on the extrapolated tracker positioning data, and outputting the 3D-scene into a head-mounted display of a VR/AR system user.

The objective is also achieved by a second aspect of the invention, which is a system for optical-inertial tracking a movable object, the system comprising:

- at least one plurality of markers, comprising IR light emitting markers;
- at least one tracker physically connected to the movable object, including an optical sensor, at least one inertial sensor, a first data processing device and a first communication device, the tracker configured to read, by the first data processing device, a picture from the optical sensor, to detect, by the first data processing device, pixels satisfying predefined conditions in the read picture, to detect, by the first data processing device, marker blobs, based on the detected pixels, to determine, by the first data processing device, parameters of the marker blobs, read, by the first data processing device, data from the at least one inertial sensor, generate, by the first data processing device, a consolidated data flow comprising the parameters of the marker blobs and the data of the at least one inertial sensor, and to transmit, by the first communication device, the consolidated data flow to a host;
- at least one host comprising a second communication device and a second data processing device, the host configured to receive, by the second communication device, the consolidated data flow, determine, by the second data processing device, a tracker positioning data in a coordinate system of a motion area of the movable object, based on the consolidated data flow, to validate, by the second data processing device, a mathematical model of a tracker motion path, based on the tracker positioning data, to extrapolate, by the second data processing device, the tracker positioning data onto an extrapolation horizon, based on the validated mathematical model of the tracker motion path.

In this system, the first data processing device may be configured to read the picture from a portion of the optical sensor, which size is less than a whole frame size of the optical sensor.

In this system, the optical sensor portion to be read may be a tracing window.

In this system, the predefined conditions may include a threshold value of brightness of the pixel.

In this system, the predefined conditions may include a requirement related to aggregation of the pixels.

In this system, the first data processing device may be configured to start detecting pixels satisfying the predefined conditions before reading the picture from the optical sensor is finished.

In this system, the first data processing device may include an FPGA configured to read the picture from the optical sensor and detect pixels satisfying the predefined conditions in the read picture.

In this system, the parameters of each of the marker blobs may include coordinates of its center in a coordinate system of a frame of the optical sensor, an effective radius and a weighted brightness.

In this system, the first data processing device may be configured to determine the coordinates of the marker center with a subpixel accuracy.

In this system, the parameters of the marker blob may include a timestamp indicating a time point, when an appropriate frame was captured.

In this system, the first data processing device may include a microcontroller configured to detect the marker blobs, based on the detected pixels, and to determine parameters of the marker blobs.

In this system, the inertial sensor may be a gyroscope.

In this system, the inertial sensor may be an accelerometer.

In this system, the data read from the inertial sensor may include a timestamp indicating a time point, when the data was read.

In this system, the consolidated data flow may include data of multiple trackers.

In this system, the second data processing device may be configured to divide the consolidated data flow into multiple consolidated data flows, a number of which corresponds to a number of the trackers.

In this system, the tracker may be combined with the host.

In this system, the second data processing device may be configured to identify the markers, based on the parameters of the marker blobs, so as to determine the tracker positioning data.

In this system, the second data processing device may be configured to identify the markers, using a predefined optical pattern.

In this system, the predefined optical pattern may be a linear optical pattern.

In this system, the linear optical pattern may include blobs corresponding to a group of three markers aligned in a line, where a distance between a first marker and a second marker is twice as much as a distance between the second marker and a third marker.

In this system, the second data processing device may be configured to generate a set of historic tracking data, based on the tracker positioning data determined for different time points.

In this system, the second data processing device may be configured to validate the mathematical model of the tracker motion path, using the set of historic tracking data.

In this system, the set of historic tracking data may include a set of data S, including a multi-dimensional vector characterizing position, orientation and (optionally) tracker motion parameters, and a set of data L, comprising data of one or more inertial sensors, where the data S and the data L may correspond to parameters of the mathematical model of the tracker motion path.

In this system, the set of historic tracking data may include a set of data OF, comprising information on rays in a local coordinate system of the tracker, the rays directed to the markers, which blobs were detected.

In this system, the second data processing device may be configured to calculate the data S in a backward direction through the entire depth of the historic tracking data, optimize the data S in an earliest point of the history, and then calculate an optimized data S in a forward direction through the entire depth of the historic tracking data during the validation of the mathematical model of the tracker motion path.

In this system, the second data processing device may be configured to calculate a vector E of the tracker positioning error, which is determined by comparison of the marker coordinates calculated, based on the data OF and predetermined actual marker coordinates, in a backward direction through the entire depth of the historic tracking data, and to optimize the data S in an earliest time point of the history, using the vector E of the tracker positioning error.

In this system, the marker coordinates calculated, based on the data OF may be polar coordinates.

In this system, the optimization of the data S in the earliest time point of the history may be performed using a least squares method.

In this system, the optimization of the data S in the earliest time point of the history may be performed, using a Levenberg-Marquardt algorithm.

In this system, the second data processing device may be configured to calculate the vector E of the tracker positioning error in a forward direction through the entire depth of the historic tracking data, and validate the mathematical model of the tracker motion path by comparing the vectors E of the tracker positioning error calculated in the forward direction and the vectors E of the tracker positioning error calculated in the backward direction, and by calculating a target function, which value is used for judging validity of the mathematical model of the tracker motion path.

In this system, the target function may be a weighting function.

In this system, a result of the validation of the mathematical model of the tracker motion path may be an optimized data S, which ensures minimal error of the tracker positioning.

In this system, the second data processing device may be configured to determine the tracker positioning data each time, when new data of the at least one inertial sensor is received in the consolidated data flow.

In this system, the second data processing device may be configured to validate the mathematical model of the tracker motion path each time, when new parameters of the marker blobs are received in the consolidated data flow.

In this system, the second data processing device may be configured to define an extrapolation horizon and an extrapolation base, and to extrapolate the tracker motion path onto the extrapolation horizon.

In this system, the extrapolation horizon may be defined, based on data received from a 3D-engine configured to render a 3D-scene.

This system may further include an output device and at least one head-mounted display configured to present a 3D-scene to a VR/AR system user, where the extrapolation of the tracker positioning data may be performed so as to further render the 3D-scene, based on the extrapolated tracker positioning data, and to output the 3D-scene into the head-mounted display of the VR/AR system user.

Embodiments of the invention allows increasing accuracy of positioning a movable object. Moreover, the invention allows easily scaling the tracking area. In VR/AR systems, embodiments of the invention allows increasing precision of tracing user movements and, therefore, increasing quality of 3D-scenes presented to the users, in particular, it allows eliminating or decreasing to a perceptibility threshold a delay of displaying the 3D-scenes relative to movements of the users and/or their body parts, thus providing a presence effect and avoiding manifestations of sea-sickness (so called VR-sickness) in the users.

BRIEF DESCRIPTION OF THE ATTACHED FIGURES

DETAILED DESCRIPTION OF EMBODIMENTS OF THE INVENTION

Figure 1:
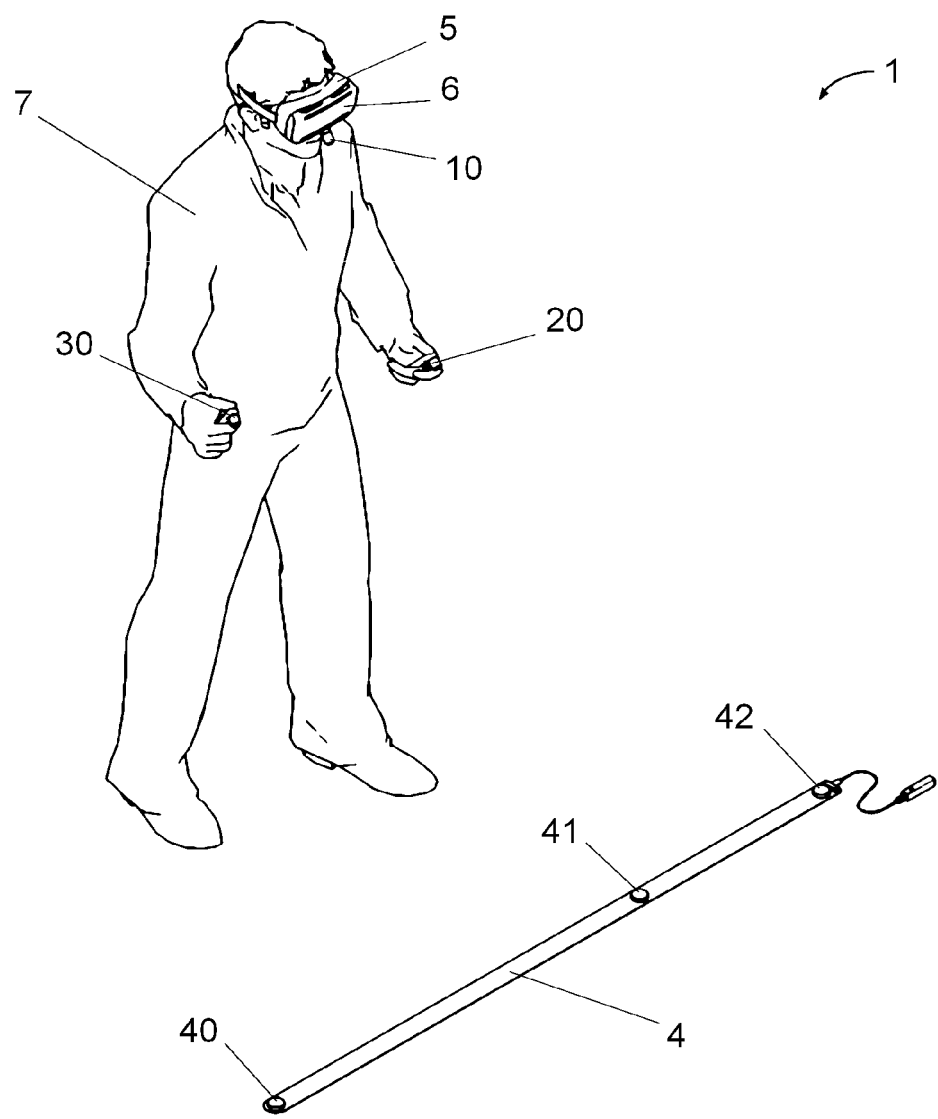
FIG. 1 shows an implementation example of a VR/AR system, according to the invention.

The invention is further explained below by way of an example of using an inside-out optical-inertial tracking method in a VR/AR system.

The invention provides an inside-out optical-inertial tracking method, where a device providing tracking (a tracker) is located on a movable object to be traced, while light sources (active markers) forming specific combinations in a picture captured by the tracker (optical patterns) are fixedly located within an operational area of a VR/AR system. The VR/AR system may include one or more trackers, and each tracker allows determining position and orientation of a corresponding movable object (or a part thereof) independently of other trackers.

Current position and orientation of each tracker is determined with a high accuracy owing to combination of optical and inertial types of tracking, while prediction of position and orientation of the tracker at a moment of outputting image to a display allows compensating a delay caused by processing and outputting information in the VR/AR system. This delay (overall delay) includes several components, such as a tracking delay, a 3D-scene rendering delay and a time for representing the 3D-scene on a display.

In existing VR/AR systems, the tracking delay is estimated to be 1 to 20 ms. The time required for the 3D-scene rendering is determined by a size of the scene and a capacity of a Graphics Processing Unit (GPU); this time may range from approximately 8 ms (at a frame rendering rate of 120 Hz) to approximately 16 ms (at a frame rendering rate of 60 Hz). The time for representing the 3D-scene on a screen is estimated to be equal to a frame duration, i.e., about 11 ms (at a frame refresh rate of 90 Hz) to about 16 ms (at a frame refresh rate of 60 Hz). Thus, even if a time for transmission of image to the screen is not taken into account, the overall delay may be 20 to 52 ms.

According to one estimate done by a person skilled in the art, an acceptable overall image response delay upon translational motion of a viewer in a VR/AR system should not exceed 16 to 32 ms, while an overall delay upon the viewer's head rotation should be 2 to 18 ms at a frame refresh rate of 60 Hz, and the delay of less than 3 ms is considered almost imperceptible [8]. According to another estimation, a threshold value of the user's perception of the delay is 7 to 15 ms [9].

The above-indicated overall delay value is applicable both for systems without prediction of the viewer's position, and for systems with prediction of the viewer's position, i.e., for systems involving time extrapolation of the viewer's coordinates. In the latter, an effective overall delay is considered, which is a time span between a moment of starting determination of the viewer's position and a moment of outputting an image to a screen, taking into account a compensation of the delay. In this case, a main criterion of a virtual reality system quality is the credibility of the viewer's position prediction.

A feature of this invention is a high accuracy of prediction of the viewer's position at a future moment of outputting an image to a display. Note that using a delay compensation per se does not guarantee precision of a 3D-scene evolution upon change in spatial position and orientation of a viewer, since prediction of the position is probabilistic in its nature, and thus constitutes an additional source of uncertainty.

The prediction is provided by using extrapolation algorithms The extrapolation algorithm's deliverables are quite sensitive to the amount and quality of input data. In particular, the following parameters affect the extrapolation accuracy:

(i) data age; the extrapolation accuracy decreases non-linearly and sharply with increase in data age;

(ii) sample set size used as a base for extrapolation; the extrapolation accuracy increases with increase in sample set size; however, when a sampling rate is fixed, increase in sample set size over some critical value causes a decrease in the extrapolation accuracy, which is attributed to aging early data in the beginning of the sample set;

(iii) data noisiness; the extrapolation accuracy decreases with an increase in data noise;

(iv) extrapolation horizon; the extrapolation accuracy decreases non-linearly and sharply with an increase in extrapolation horizon range.

The following set of engineering solutions was employed to ensure a high extrapolation accuracy in the invention:

using hybrid optical-inertial tracking approach, which allows increasing a sample set size, owing to a high rate of reading data from inertial sensors;

using active markers, which allows decreasing optical data noisiness and decreasing exposure time of an optical sensor, thus reducing a hardware delay while generating the optical data;

optionally using a "tracing window" in an optical sensor, which allows further reducing a hardware delay while generating the optical data;

automatic verification of a mathematical model of a tracker motion path, which allows increasing a tracking accuracy when markers are shaded, as well as broadening an extrapolation horizon with no loss of predicted data reliability.

Figure 2:
FIG. 2 shows an example of placement of VR/AR system devices on a user's body, according to the invention.

FIG. 1 and FIG. 2 show an implementation example of the invention, where a VR/AR system 1 includes a head-mounted display (HMD) 5, a tracker 10 located on the HMD 5, a central device (host) 6, also located on the HMD 5, a tracker 20, a tracker 30 and a marker strip 4 comprising active markers 40, 41, 42. The HMD 5 provides presenting an image generated by the system 1 to a user 7, where the image is generated, based on tracking data acquired from the trackers 10, 20, 30. The image presented to the user may be a virtual reality 3D image or an augmented reality 3D image. The tracking data generated by the trackers 10, 20, 30 include data on spatial positions of the trackers and, therefore, of corresponding body parts of the user 7, data on orientations of the trackers and their motion parameters, namely, direction, speed and acceleration. This data is stored in the system 1 and used for determination of current position, orientation and motion parameters (when applicable) of the user's body parts, as well as for prediction of their positions, orientations and motion parameters in the future within an extrapolation horizon. The tracking data may be processed by the system 1, based on physical and kinematic models of the user 7, thus providing calculation of the user's body position (including posture, gestures, etc.), when applicable, according to purpose of the system 1 and a screenplay or a gameplay, with a periodicity and an accuracy required for ensuring a presence effect of virtual or augmented reality and for eliminating sea sickness signs.

The tracker 10 includes an optical sensor 101, a gyroscope 102 and an accelerometer 103. Data of the optical sensor 101 is characterized by a high accuracy needed for determination of spatial position and orientation of the device; however, a rate of data acquisition from the optical sensor is much less than a rate of data acquisition from the inertial sensors, the gyroscope and the accelerometer. In particular, a usual rate of data acquisition from the optical sensor is 60 frames per second (at full frame operations) and it may be increased up to 400 frames per second, when region of interest (ROI) techniques are used and frame size is reduced (i.e., when a tracing window approach is employed). Meanwhile, a typical rate of data acquisition from the gyroscope and the accelerometer is approximately 2000 samples per second. However, if only the gyroscope and accelerometer data is used, an absolute positioning error accumulates very fast due to the data noise and drift.

Note that the tracker includes two inertial sensors, the gyroscope and the accelerometer, in an illustrative embodiment of the invention. However, the number of the inertial sensors may be fewer or more than two in other embodiments of the invention, and an operating principle thereof may also be different.

In the invention, accuracy of the optical data is combined with a high rate ant a low delay of the inertial sensor data, which allows providing a consolidated tracking data flow suitable for implementation of an algorithm of current positioning data determination and future positioning data prediction, related to position, orientation and movement parameters of a user, thus ensuring high capabilities of the VR/AR system.

Transmission of a picture from a whole optical sensor requires a wide bandwidth channel between the tracker and the host and inevitably involves additional delay related to transmission of the picture. In order to minimize delays of processing tracking data, related to the picture transmission, the picture from the optical sensor is processed in the tracker directly, coordinates and size values of marker blobs detected in the picture are calculated and transmitted to the host.

The tracker 10 includes data processing device 104 for processing the tracking data. The data processing device 104 provides synchronization of all sensors, acquisition of data from the optical sensor, the gyroscope and the accelerometer, processing data of the optical sensor to form information on markers found in the frame, generation of the consolidated tracking data flow including the gyroscope and accelerometer data and the marker data.

The data processing device 104 may be implemented on a basis of a microcontroller, a digital signal processor (DSP), a processor with a reduced instruction set (RISC), etc. In an illustrative embodiment of the invention, the data processing device 104 is implemented, based on RISC-microcontroller STM32F446MEY6 (STMicroelectronics, Switzerland).

The data processing device 104 may include an optical sensor data preprocessing device 108, e.g., based on an FPGA, which allows using high-speed algorithms for parallel processing picture lines and for searching groups of pixels presumably corresponding to markers in the picture. In this case, one-pass picture processing is done during a step of reading data from the optical sensor, with no need of storing an entire frame in a storage device 107 of the tracker. This solution substantially reduces calculation complexity of a subsequent tracking data processing in the data processing device 104 and allows further reducing delays in the VR/AR system. Moreover, this solution allows reducing requirements for the capacity of the storage device 107. In an illustrative embodiment of the invention, the optical sensor data preprocessing device is implemented, based on FPGA LCMXO3LF-2100E-5UWG49CTR50 (Lattice Semiconductor Corporation, USA).

The tracker 10 also includes a communication device 106 for providing information exchange between the tracker 10 and the host 6. A consolidated tracking data flow is transmitted from the tracker 10 to the host 6 at a rate of approximately 2000 to approximately 4000 samples per second, where the accelerometer data and the gyroscope data are updated each at a rate of approximately 2000 samples per second, while the optical sensor data is updated at a rate of approximately 60 to 400 samples per second. Control signals are transmitted from the host 6 to the tracker 10, according to purpose of the VR/AR system and its screenplay or gameplay. The communication channel may be an optical, wire, or wireless link. For example, a WiFi, Bluetooth, etc channel may be used in the system 1 as a wireless link. In an illustrative embodiment of the invention, the communication device 106 provides a wire communication link based on a USB interface having a transmission capacity of 6 Mbps or more and a time lag of 1 ms or less, and a 2.4 GHz wireless link involving a proprietary data exchange protocol ensuring a transmission capacity of 1 Mbps or more and a time lag of 0.4 ms or less.

The tracker 10 also includes a power source 105 providing electrical power to the tracker. The power source 105 is a common device widely known to those skilled in the art, so its detailed description is omitted.

Arrangement of all sensors in one device provides synchronization of the sensors. This architecture approach allows using precise timestamps for data acquired from each of the sensors. Additionally, as capturing a frame in the optical sensor and its processing takes a certain time depending on an exposure time, which, in turn, depends on environmental conditions (in particular, illumination of an operational area), a start time point of capturing a frame, a notification of end of processing of the frame and new optical data arrival are provided in the consolidated data flow.

Figure 4:
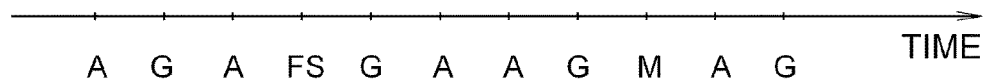
FIG. 4 shows a diagram of events during arranging sensor data into a consolidated data flow.

FIG. 4 shows events of including data of sensors into the consolidated data flow:
event A is supply of the accelerometer data;
event G is supply of the gyroscope data;
event FS is start of capturing a frame;
event M is supply of the marker data after processing an optical frame.

The marker data includes 2D coordinates (in a coordinate system of the optical sensor) and a size of each marker blob found in a picture.

Figure 3:
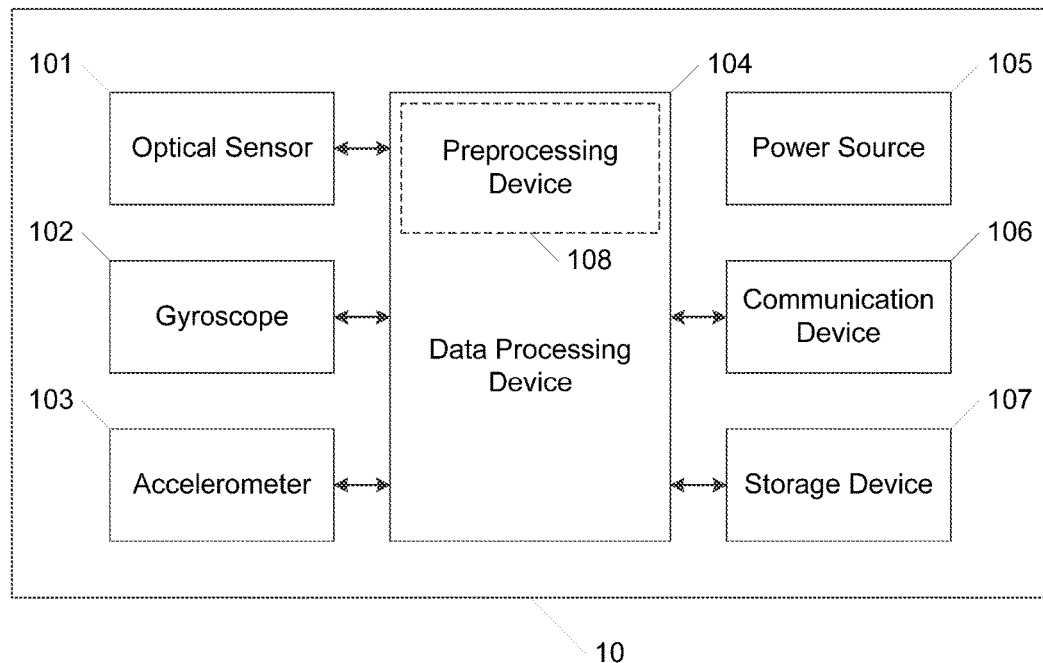
FIG. 3 shows a block diagram of a tracker, according to the invention.

Each sensor operates at an appropriate rate; therefore a situation is possible, when the consolidated data flow includes consecutive data of one sensor, e.g., accelerometer data or gyroscope data, as may be seen in FIG. 3.

The consolidated data flow is received in the host 6, where calculation of 3D coordinates of spatial position and orientation of the tracker (in a coordinate system of the VR/AR system operational area) and its motion parameters, i.e., direction, velocity and acceleration, is performed, based on the marker data. A computer or a mobile device having a sufficient processor performance may be used as the host. For example, a device performing rendering 3D scenes further outputted to the HMD 5 in the VR/AR system may be used as the host. In some cases, the HMD 5 itself having a sufficient calculation performance may be used as the host. Moreover, activities of the host 6 may be distributed over multiple devices. In particular, calculation of 3D coordinates of spatial position, orientation of the tracker and its motion parameters may be performed by one of these multiple devices, while rendering and outputting 3D scenes to the HMD may be performed by another of these multiple devices; these devices may be co-located or they may be located in different places and linked by known communication means, as is known to a skilled artisan, so a description of these means are omitted for brevity.

The required performance of the host depends on purpose of the VR/AR system, a number of users, a size of the operational area, dynamism of the user's motions, etc. In an illustrative embodiment of the invention, smartphone GALAXY S7 (SAMSUNG, South Korea) is used as the host. The tracker may be structurally separated from the host and may be available for the users independently of the host, in order to simplify the VR/AR system and reduce its cost. However, structural aggregation of the tracker and the host is also possible, e.g., in those VR/AR systems, where using third-party devices is not supposed. In this case, the communication device 106 in the tracker and the communication device 61 in the host may be implemented, using an internal communication interface, e.g., I²C or a faster communication interface like USB or LVDS. Moreover, besides the structural aggregation of the tracker and the host, aggregation of data processing devices of the tracker and the host into a single data processing device is also possible, which removes a need for using communication devices for data transmission between the data processing devices.

The tracker 10 may be arranged according to a modular approach. In particular, the tracker 10 may include a base unit 11 comprising the optical sensor 101, the gyroscope 102, the accelerometer 103, the data processing device 104 and the communication device 106 providing a wire or wireless communication; and it may include a replaceable unit comprising additional devices providing necessary functions, according to purpose of the VR/AR system.

Figure 5:
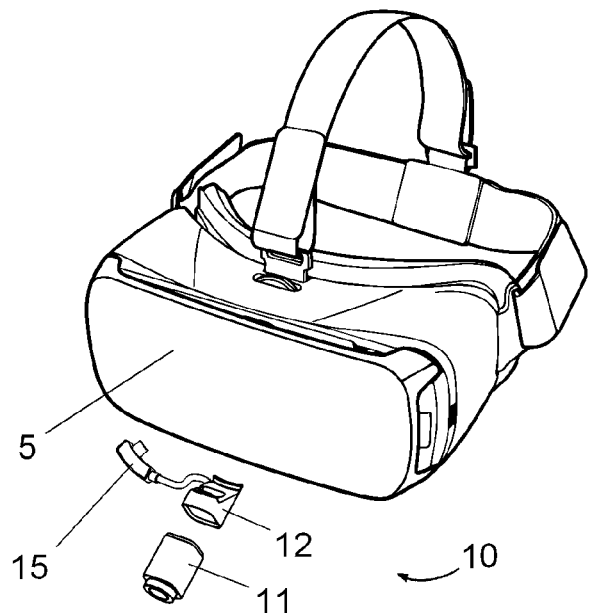
FIG. 5 shows an example of installation of a tracker on a head-mounted display, using a replaceable unit.

FIG. 5 shows an example, where the tracker 10 includes the base unit 11 and the replaceable unit 12 in a form of a mounting pad for the base unit 11, thus providing fastening the tracker 10 to the host 6 and electrical connection between them by a connector 15. Lens of the tracker 10 is oriented forward and downward, according to use of marker strips 4 disposed on the floor. Apparently, the tracker 10 may be oriented differently, if the marker strips 4 are disposed in a different manner, e.g., on the ceiling, on masts, etc.

Figure 6:
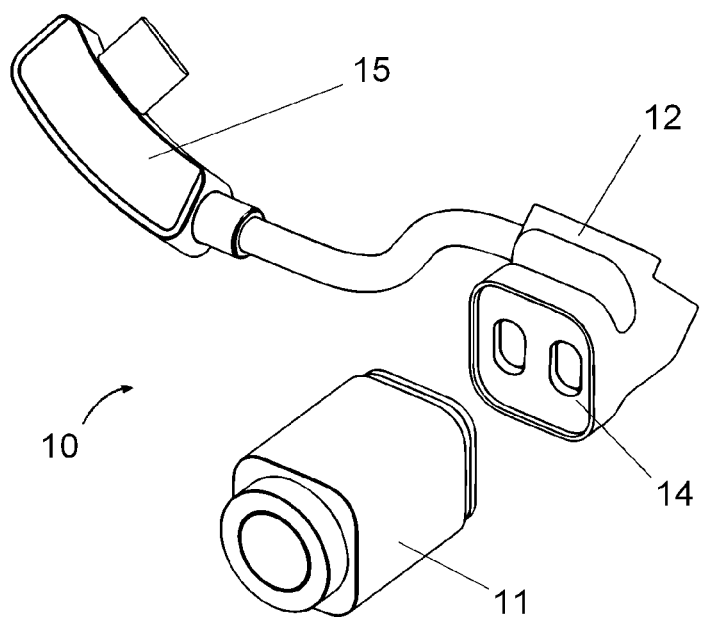
FIG. 6 shows an example of a tracker comprising a base unit and a replaceable unit.

The base unit 11 and the replaceable unit 12 are shown in detail in FIG. 6. Connection between the base unit 11 and the replaceable unit 12 are implemented, using a magnet connector 14, which provides both mechanical attachment and electrical connection.

Figure 7:
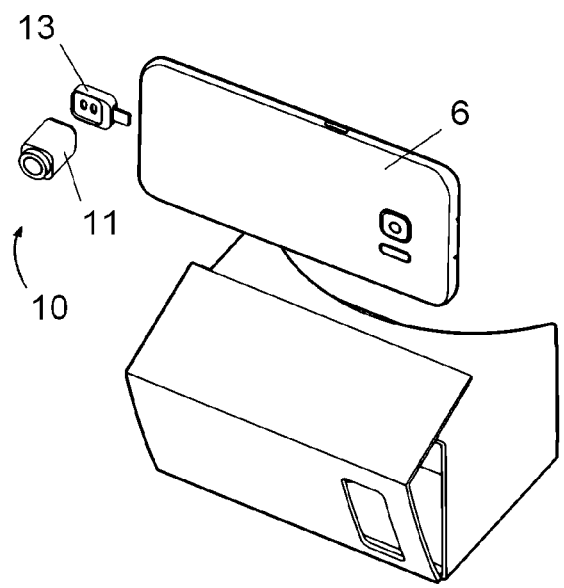
FIG. 7 shows another example of installation of a tracker on a head-mounted display, using a replaceable unit.
Figure 8:
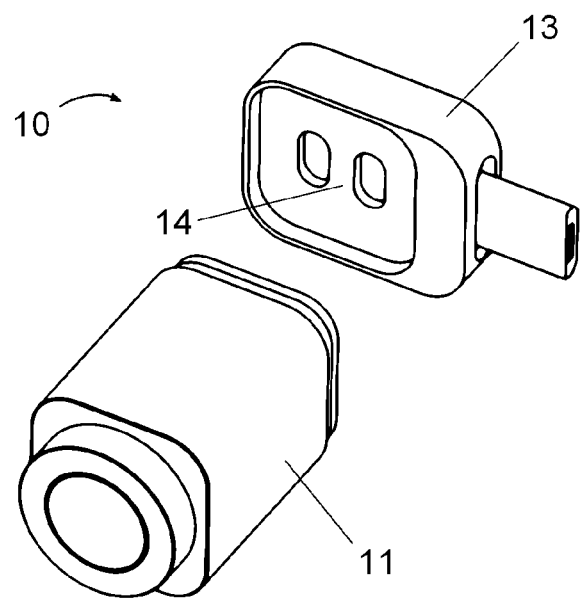
FIG. 8 shows another example of a tracker comprising a base unit and a replaceable unit.

FIG. 7 shows an example, where the tracker 10 includes the base unit 11 and the replaceable unit 13 providing mechanical attachment to the host 6 and wired connection by a standard connector, where the host may be a smartphone and may serve as a HMD in a low-end VR/AR system. FIG. 8 shows the base unit 11 and the replaceable unit 13 in detail. The magnet connector 14 is similar to that shown in FIG. 7.

The tracker 20 and the tracker 30 may be identical to the tracker 10 or they may have some differences caused by a different manner of movements of corresponding user's body parts. In particular, the trackers 20 and 30 attached to game controllers in the user's hands may be able to trace faster and jerk-like movements, compared to the tracker 10 located on the user's head. However, the general concept of the tracking system operations is substantially the same in any option.

Figure 9:
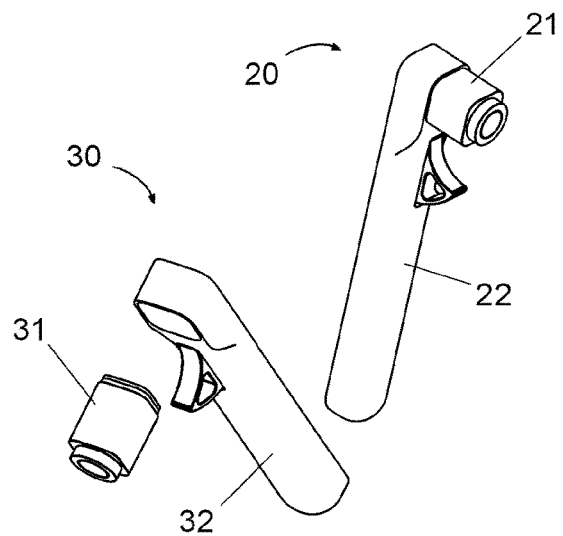
FIG. 9 shows still another example of a tracker comprising a base unit and a replaceable unit in a form of a game manipulator.

A controller 22, 32 may be a game controller or a manipulator for educational or entertainment systems and may include control means typical for such devices, e.g., buttons, keys, joysticks, trackballs, etc. According to the modular concept of the tracker, the controller 22, 32 may be considered as a replaceable unit for the base unit 21, 31. Data transmission from the control means of the controller 22, 32 to the host 6 may be performed by a wireless method, e.g., using the same wireless link, as used for transmission of the consolidated data flow from the trackers 20, 30. FIG. 9 shows an example of connection between the controllers 22, 32 and the base units 21, 31, correspondingly, which may be implemented, using a magnet connector similar to that shown in FIG. 7 and FIG. 8.

The trackers 10, 20, 30, e.g., related to the same user, may be a group of trackers, where information exchange among them is provided via a wireless link. In particular, data of the slave trackers 20, 30 may be transmitted to the master tracker 10 via a wireless link, and further transmitted to the host 6, using a wired or wireless link. This provides a possibility of flexible configuring the VR/AR system, including a possibility of its configuring by a user. The configuration flexibility includes possibility of defining groups of trackers related to one or another user, which is particularly important for multi-user VR/AR systems. Meanwhile, this architecture solution requires a more capable communication channel for transmitting data from the slave trackers (e.g., the trackers 20, 30) through the master tracker (e.g., the tracker 10) to the host 6. Thus, the communication channel capacity should be provided in proportion to a number of the served trackers.

The marker strip 4 (FIG. 10A) includes a base in a form of a narrow flexible strip made of a polymer material, with flexible conductors providing power supply to the active markers 40, 41, 42. The base material may be a woven or non-woven material. Flexibility of the base and the conductors ensures compact size of the marker strip in its convoluted (bent) state during storage and transportation (FIG. 10B); at the same, this arrangement ensures its sufficient transversal rigidity (in its installation plane) and constant distance between the markers, which is necessary for providing a stable optical pattern. The conductors may be metallic, metallized, oxide, composite, based on a thick-film or thin-film technology, so as to provide feed of a safe voltage at a value of power consumption of about a few watts. The active markers 40, 41, 42 may be fastened to the base by any suitable way so as to provide a reliable attachment thereof to predefined places and feed of the supply voltage. In an illustrative embodiment of the invention, flat strip metal conductors are used, and the active markers 40, 41, 42 are fastened to the base by magnet connectors providing fast mounting the markers onto the base and dismantling therefrom, while ease of dismantling the markers protects the marker strip 4 against damage, when a user unintentionally contacts the markers physically. Power is supplied to the markers 40, 41, 42 from a power source 45 via a cable 44 and an electrical connector 43.

The power source 45 may be any mains-connected or off-line power source, which provides required safe AC or DC voltage (e.g., 5, 6, 12, 24, 36 or 48 V). For example, a 5 VDC or a 12 VDC battery like PowerBank often used for feeding/charging mobile devices or a 12.6 VDC battery like Booster intended for facilitating start of a car engine when a main battery is discharged may be employed as the off-line power source. If multiple marker strips 4 are used in the system 1, the power supply may be provided in a centralized manner by a single power source; alternatively, the power supply may be provided in a distributed manner, when each marker strip 4 is fed by a separate power source. A centralized power supply may be preferable for permanent commercial VR/AR systems, particularly, when the marker strips 4 are built-in into the floor or located on the walls or ceiling of the room. A distributed power supply may be preferable for mobile amateur VR/AR systems, particularly, suitable for outdoor use.

The cable 44 and the electrical connector 43 may be of any suitable type. Choosing thereof is a trivial task for an artisan, so this point is omitted.

Each of the markers 40, 41, 42 is an IR LED emitter having a near-semispherical directional characteristic. The required directional characteristic is ensured by placement and orientation of one or more LED chips, as well as use of a light diffuser, e.g., based on a Fresnel lens. The marker may include a driver providing operational capability of the LED emitter in a wide range of supply voltage.

A combination of the markers 40, 41, 42 located in a predefined manner forms an optical pattern, which presence and spatial position is detected by the host 6, based on marker data available in the consolidated data flow from the tracker 10. The use of active markers is preferable in the inside-out tracking concept; this provides a number of advantages in comparison to the use of passive (retroreflective) markers. In particular, when active markers are used, no additional power supply for the tracker is needed for illuminating the passive markers; this is of particular importance when the tracker is placed on a movable object. The available tracking area size is defined by dimensions of the markers and brightness thereof. Powering the markers by mains-connected or off-line power sources allows multiply increasing emission power of the markers, thus expanding the tracking area size, whereas a power consumption of the tracker itself is not changed.

Figure 10A:
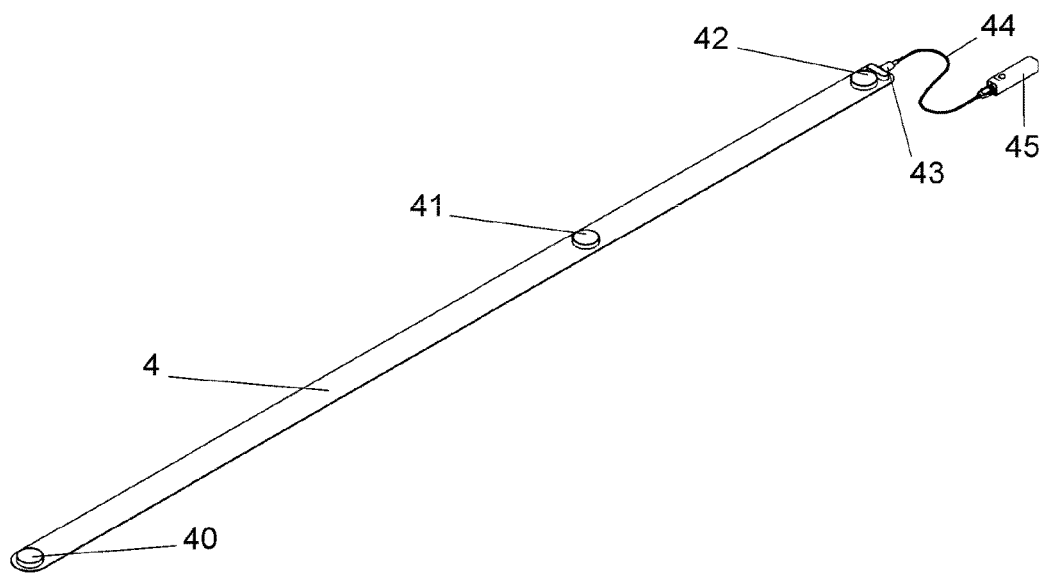
FIG. 10A and FIG. 10B show a marker strip in a deployed state and in a convoluted state, correspondingly.
Figure 10B:
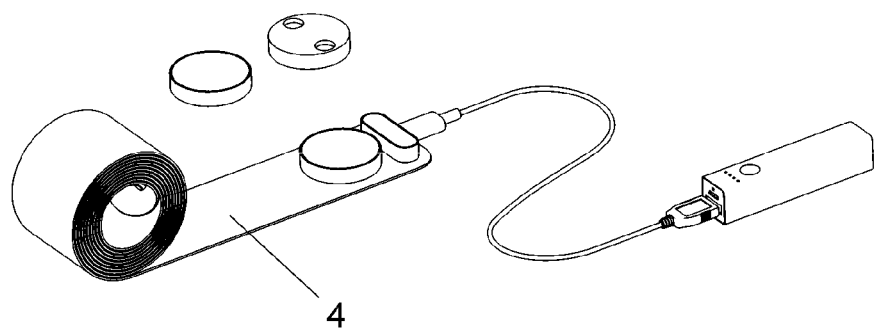

The optical pattern may be a linear pattern, which is detected by a marker data processing algorithm. The linear pattern is characterized by a predefined ratio of distances between markers. In particular, in an embodiment of the invention, where three markers are disposed in a line and form a sequence 40-41-42, as shown in FIG. 10A, a distance between markers 40 and 41 is twice the distance between markers 41 and 42. The distance ratio may be different, as long as reliable identification of the optical pattern is maintained in the system.

The operational area may be scaled by increasing a length of the marker strip 4, while the distance ratio is maintained and luminescent surface of the markers and their brightness are high enough. This allows expanding the operational area substantially, while providing high tracing parameters, as long as angular and luminosity parameters of the marker blobs within the optical sensor frame are maintained.

The optical pattern may be a linear pattern having more markers, e.g., four, five, etc. markers; the optical pattern may also be a non-linear pattern, i.e., the markers may be disposed not in a line.

Besides the above method of increasing the operational area, there is a possibility of almost unlimited scaling the operational area by way of adding marker strips. In this case, combinations of linear patterns are added to a whole tracing picture, instead of combinations of individual markers. Thus, the system detects presence of predefined linear patterns in a frame and then determines disposition of the patterns relative to each other. This allows defining a combination of linear patterns so as to ensure unambiguous determination of the tracker position by the tracking system within the operational area, based on a map of linear patterns, which is developed during calibration of the tracking system. This approach may be used for arranging either the operational area of a simple shape and disposed in one room, or the operational area of a complex shape, which may be distributed over multiple adjacent rooms.

Therefore, one of advantages of the invention is fast and easy scaling of the tracking area by way of adding new marker strips. In outside-in optical tracking systems, where markers are located on a movable object, additional cameras should be employed for expanding the tracking area, which is usually a complicated and expensive way. In the present invention, cost of marker strips is low and labor content of their installation is negligible.

Depending on a screenplay or gameplay, the marker strips may be disposed on the floor, the walls or the ceiling of a premise. Combined options are also possible, when the marker strips are disposed on the walls and the ceiling, or on the floor and the walls. In stationary embodiments of the invention, the markers may be built-in into the floor, the walls or the ceiling. In transportable embodiments of the invention like exhibition samples, the markers may be built-in into a sectional dismountable floor, which is a part of an exhibition installation set.

Figure 11:
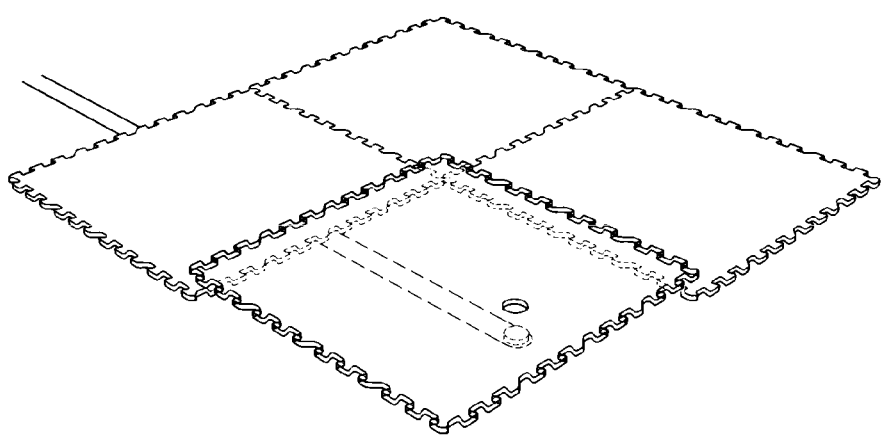
FIG. 11 shows an example of installation of markers, using elastic sectional floor mats (so-called puzzle floor mats).

As an alternative, in transportable embodiments of the invention, the marker strips may be arranged, using elastic sectional floor mats (puzzle floor mats, see FIG. 11), which are coupled to each other, when in an operational position, thus ensuring geometrical precision of arranging the operational area, its shape and dimensions stability, and therefore, facilitating the VR/AR system set-up and adjustment. The markers may be mounted in predefined points of the floor mats. The predefined points may be apertures of corresponding shapes receiving the markers, while unused apertures may be closed with plugs made of the same material as the floor mat itself. When a centralized power supply is employed, supply wires may be disposed below the floor mats. The supply wires may be of a flat strip shape, which design eliminates their appearance as irregularities on the working surface of the floor mats. Partnering the marker strips shown in FIGS. 10A and 10B and the sectional floor mats is also possible.

Figure 12:
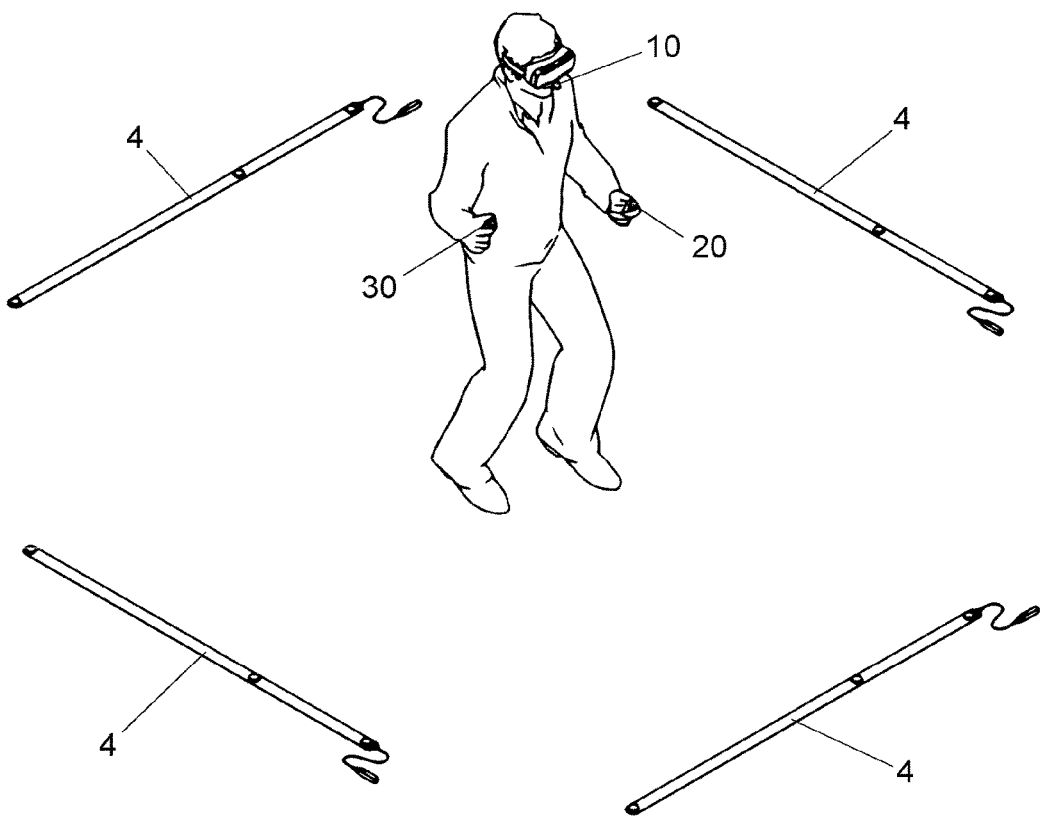
FIG. 12 shows an example of placement of marker strips on a floor.

As for amateur use, where fast installation and easy application are key factors, a floor-based option may be preferable, where a user is able to place the marker strips on the floor, arrange them into a near-rectangle shape and connect them to one or more power sources (FIG. 12). Installation of such a system usually takes not more than a couple of minutes.

Figure 13:
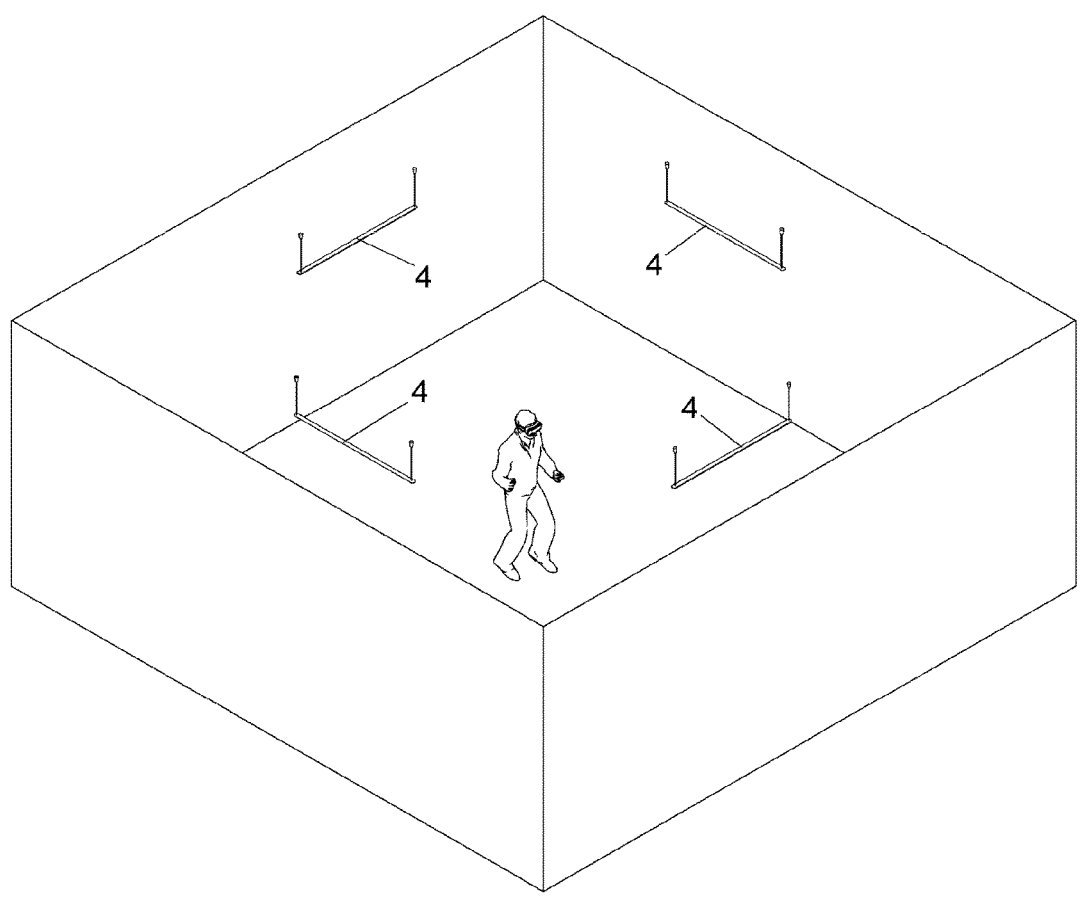
FIG. 13 shows an example of mounting marker strips on a ceiling.

As for commercial use, in particular, for VR-parks, it is important to dispose the marker strips out of reach of users, so their actions could not alter characteristics of the operational area, as defined during calibration and/or specified by the system setup parameters. Moreover, commercial VR/AR systems are often multi-user systems, therefore, it is expedient to take into account a possibility of shading the markers by users during their migrations within the operational area, when choosing disposition of the marker strips. In this case an option of placing the marker strips on the walls or ceiling (see FIG. 13, the ceiling is not shown) may be preferable. Note that the operational area size may be substantially greater than dimensions of a geometric figure outlined by the marker strips, if the marker strips are disposed on the ceiling.

Figure 14:
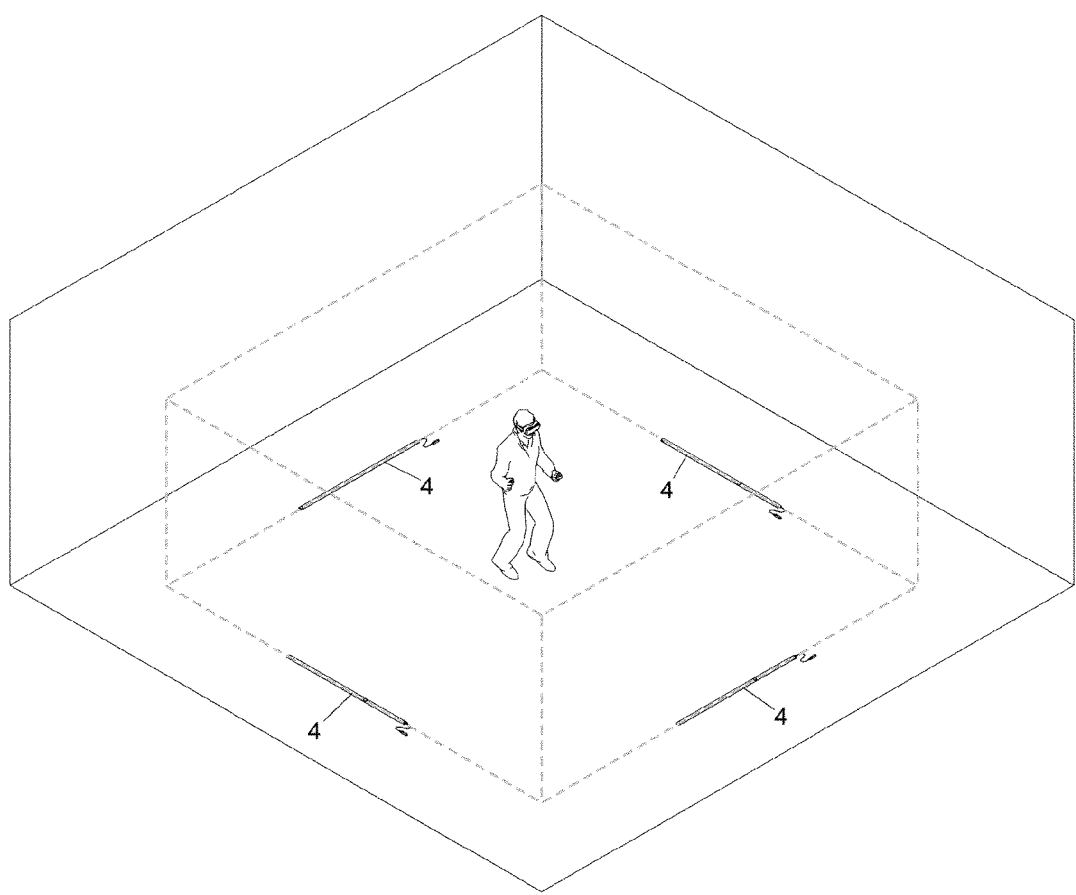
FIG. 14 shows an example of placement of marker strips on a floor, where virtual world boundaries are defined at a safe distance from walls of a room.

It may be important to define boundaries of the virtual world for users of a VR/AR system, so as to facilitate them in avoiding collisions with the real world items like walls, furniture, domestic articles, etc. The invention is advantageous in that the marker strips may define boundaries of the virtual world, in particular, when placed on the floor or ceiling, besides their main purpose of creating an optical marking for the tracker. In FIG. 14, definition of the virtual world boundaries is illustrated by dashed lines, where the boundaries are defined at some distance from the walls for safety reasons. When a user approaches a virtual world boundary, the VR/AR system may generate a visual or acoustic signal to warn the user of unsafe proximity of the real world items.

Figure 15:
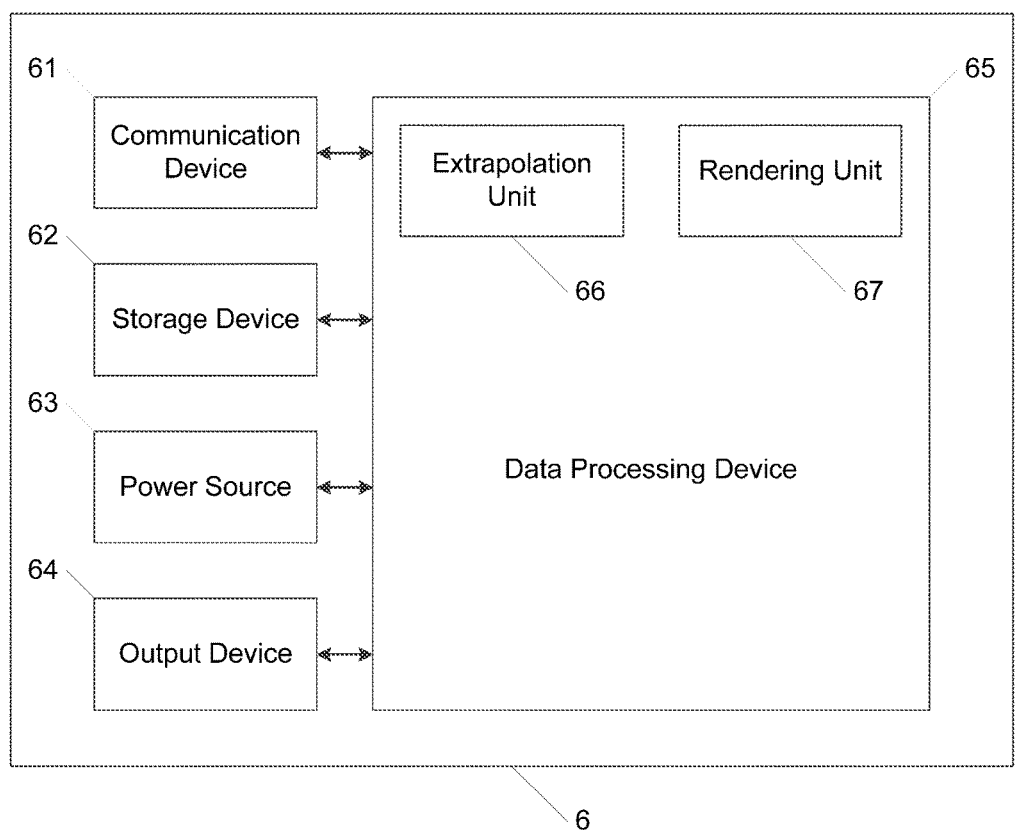
FIG. 15 shows a block diagram of a host, according to the invention.

Host 6 (FIG. 15) includes a communication device 61 providing data exchange between the host 6 and the tracker 10, a storage device 62 for storing programs and data, a power source 63 providing electrical power to the host hardware, an output device 64 providing image output to the HMD 5, and data processing device 65 providing processing data received from the tracker 10. The output device 64 may include a communication device for transmitting image data to the HMD 5, when the host 6 is structurally separated from the HMD 5 and they are located at a distance from each other. The data processing device 65 includes an extrapolation unit 66 providing extrapolation of positioning data, and a rendering unit 67 providing development of 3D-scenes to be outputted to the HMD 5.

In another embodiment of the invention, the rendering unit 67 providing development of 3D-scenes to be outputted to the HMD 5 may be a part of a device, which is external to the host 6, instead of being a part of the host 6. In particular, functions of the rendering unit 67 may be implemented in a separate computer or in the head-mounted display itself, and data extrapolation outcome may be transmitted from the host 6 to such a computer or to the head-mounted display, e.g., via the communication device 61.

The communication device 61 of the host 6 shall be compatible with the communication device 106 of the tracker 10 and shall meet the same requirements, as the communication device 106 of the tracker 10. The storage device 62, the power source 63 and the output device 64 are common units, which are well-known, so their detailed description is omitted.

Figure 16:
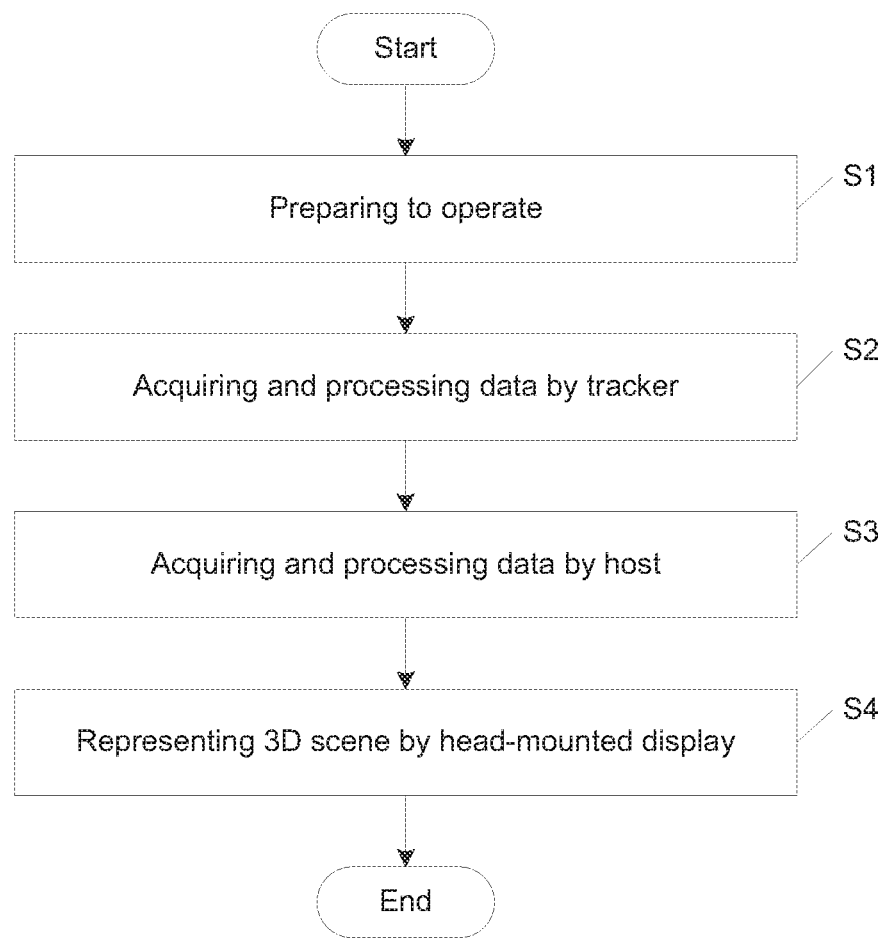
FIG. 16 shows a flowchart of an algorithm illustrating an operation concept of a VR/AR system, according to the invention.

The general operation concept of the VR/AR system 1 is illustrated by an algorithm flowchart in FIG. 16. In step S1, the system 1 is prepared to operate. In step S2, tracking data is acquired and processed in the tracker 10. In step S3, tracking data is received and processed in the host 6. In step S4, a 3D-scene is represented by the HMD 5.

Figure 17:
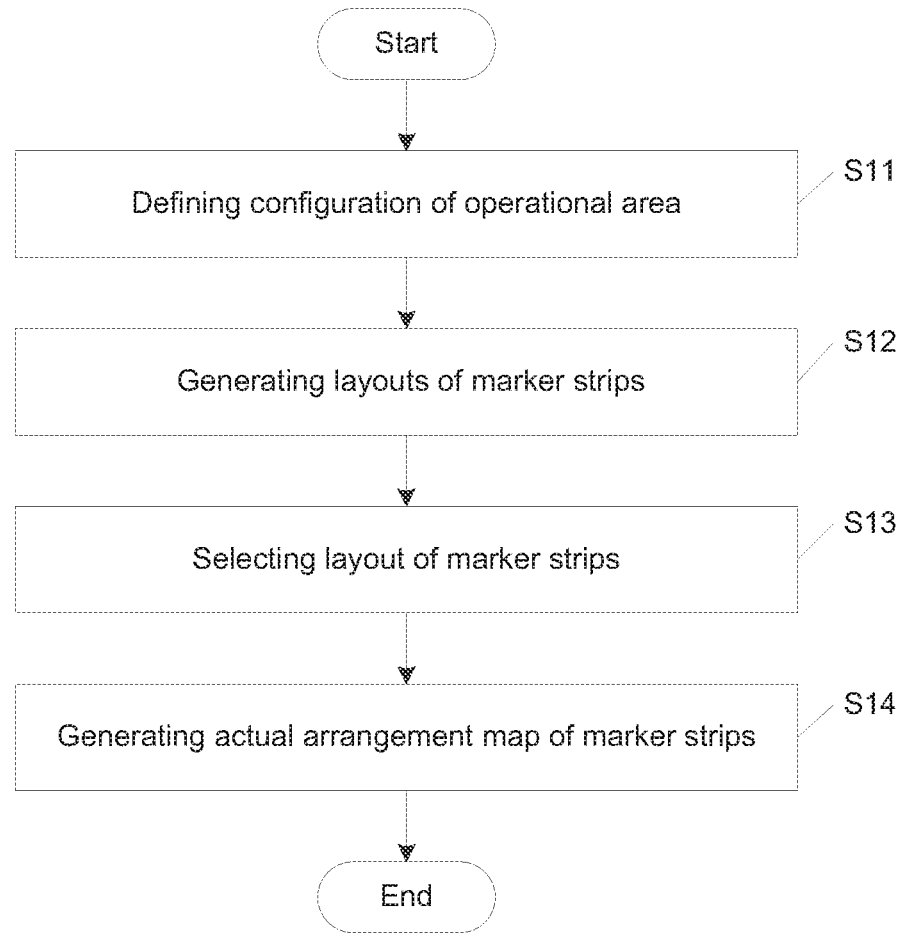
FIG. 17 shows a flowchart of an algorithm illustrating a start-up process of a VR/AR system, according to the invention.

Generally, the system 1 includes multiple marker strips 4 in its operational area, while the operational area is formed anew and the step 1 includes several steps (FIG. 17).

Step S11 is defining configuration of the operational area; in this step, a shape and dimensions of an area are defined, where tracking a movable object shall be provided.

Step S12 is generating a layout of marker strips; in this step, an option of placing the marker strips or a number of such options is calculated for the operational area defined in Step S11, so as to provide most reliable determination of the tracker position within the operational area. This step is required, when the operational area has a complex shape; it is optional, when the operational area has a rather simple shape; it is also required, when the operational area is of a simple shape, but large size, so multiple variants of the marker strips layout are possible. Some special software may be used for generating the marker strips layout.

Step S13 is selecting a marker strips layout; in this step, a marker strips layout is selected among layouts already existing in the system and the marker strips layout(s) generated in Step 12.

Step S14 is generating an actual arrangement map of the marker strips; in this step, a tracker shall be moved within the operational area, until the systems detects all linear patterns according to the selected layout. Note that strict conformity is not needed between geometry of the actual arrangement and the selected layout of the marker strips, when the operational area has a simple shape. For example, if a rectangular shape is used, then angles between the marker strips do not need to be exactly 90°; it is enough to place the marker strips in a shape more or less similar to a rectangle. In this step, the system 1 performs an automatic calibration procedure by way of matching the actual marker strips arrangement and positions of the marker strips according to the selected layout. This feature of the system 1 is important in view of simplicity of its installation, as it ensures a high flexibility of using the system according to user's use cases, including indoor and outdoor options.

In systems 1 having a fixed configuration, step S1 may be streamlined by excluding actions required for formation of a new operational area. In particular, in stationary systems and in mobile systems having a fixed configuration, e.g., when the configuration is determined by a set of puzzle floor mats with built-in active markers 40, 41, 42, the automatic calibration procedure in Step S14 may be omitted or even whole step S14 may be omitted.

Figure 18:
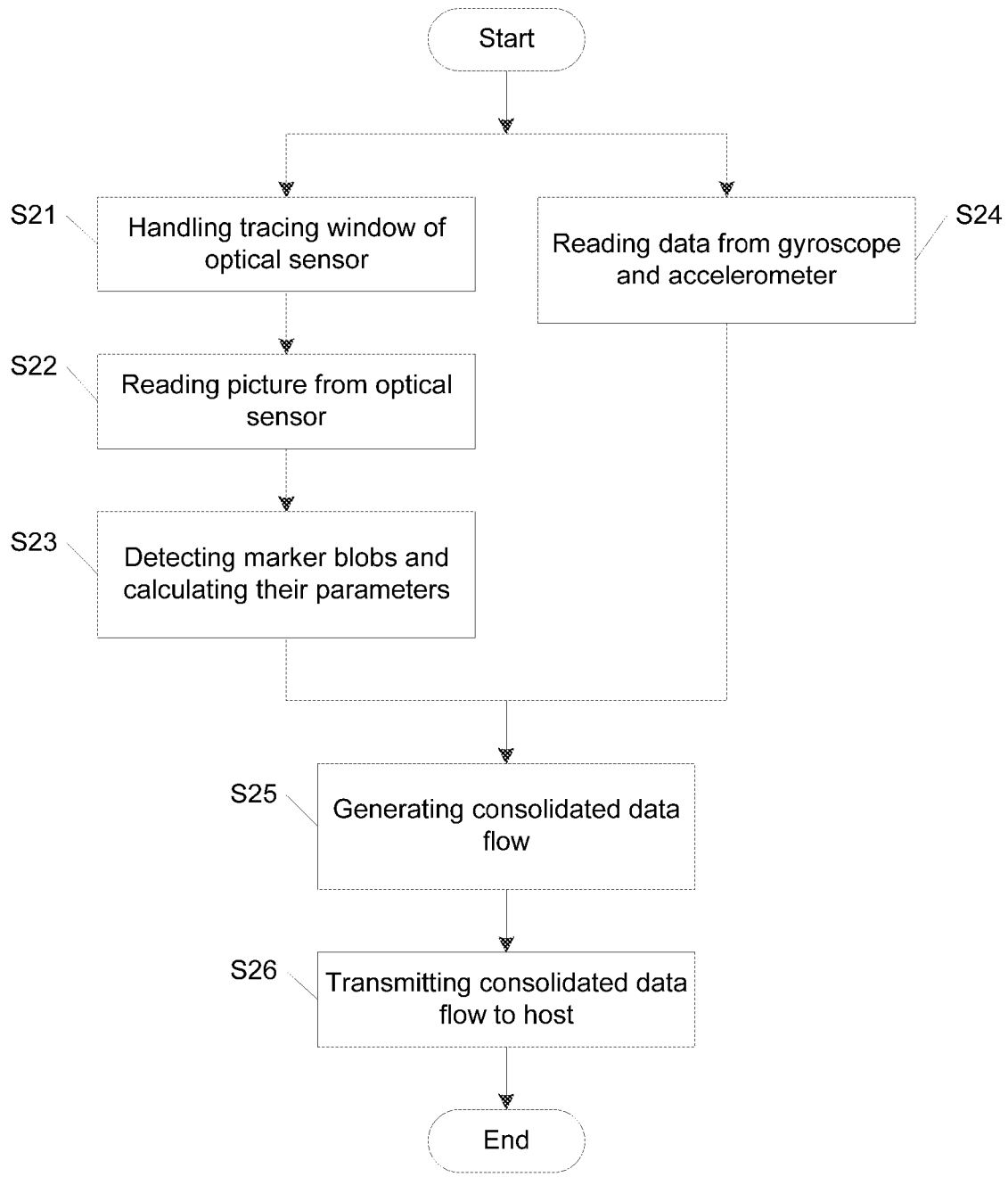
FIG. 18 shows a flowchart of an algorithm illustrating a procedure of acquiring and processing data in a tracker.

Step S2 includes a number of steps (FIG. 18).

Step S21 is handling a tracing window of the optical sensor; the tracing window of the optical sensor is an area of reading data from the optical sensor, which may move within a frame of the optical sensor, depending on positions of marker blobs in the frame. Use of the tracing window allows accelerated reading data from the optical sensor, and thus reduces a hardware delay during generation of the optical data. In particular, use of the tracing window allows increasing optical data reading rate from 60 samples per second up to 400 samples per second. An example of a tracing window handling algorithm for the optical sensor is disclosed in publication WO2016108720A1 related to an earlier patent application of the inventor, therefore its detailed description is omitted. This step is optional, i.e., when use of the tracing window is not required, then the area of reading data is set to be equal to the whole frame of the optical sensor.

Step S22 is reading a picture from the optical sensor within the area of reading; data is transmitted from the optical sensor to the data processing unit 104 via a high-speed data transmission standard LVDS (low-voltage differential signaling); the data processing unit 104 detects pixels, which brightness exceeds a predefined threshold set in settings, in each line of the read picture, further it recognizes groups of these pixels and records the following information on the recognized groups into an exchange buffer: (a) a coordinate of the group beginning; (b) a size (a length) of the group; and (c) three parameters characterizing the group, namely, a sum of brightness values of the pixels in the group, a sum of brightness values of the pixels in the group multiplied by linear coordinates of the pixels in the line, and a sum of squared brightness values of the pixels in the group. A predefined limitation may be applied to size of the recognized groups, e.g., it may be predefined that the group must include at least three bright pixels, and only that data related to lines, where at least one group has been recognized, may be sent to the exchange buffer. Depending on purpose of the VR/AR system, information content of the exchange buffer may differ from the above-indicated; however, it must be enough for performing further steps of the algorithm. In an illustrative embodiment of the invention, step S22 is performed by FPGA LCMXO3LF-2100E-5UWG49CTR50.

Step S23 is detecting blobs of markers and calculating their parameters; groups of bright pixels are analyzed in each line, which data is received from the exchange buffer, and the groups of bright pixels of the currently analyzed line are matched with the groups of bright pixels of the previously analyzed line and corresponding groups are aggregated to form a marker blob. The following parameters are determined for each detected marker blob: (a) 2D coordinates of its center in a coordinate system of the optical sensor frame, (b) its effective radius and (c) weighted brightness. The center coordinates of a marker blob may be determined with a subpixel accuracy and parameters of the marker blob may include a timestamp indicating a time point of capturing a corresponding frame and this timestamp is further used during processing the consolidated data flow in the host 6. Depending on the purpose of the VR/AR system, the content of the marker blob parameters may differ from the above-indicated; however, it must be sufficient for performing further steps of the algorithm. In an illustrative embodiment of the invention, step S23 is performed by a microcontroller STM32F446MEY6.

Step S24 is reading data from the gyroscope and the accelerometer; in this step, data is read from the gyroscope and the accelerometer at a predefined rate; this data may include a timestamp indicating a time point, when the data was read, and the timestamp is further used during processing the consolidated data flow in the host 6. Content of data of the inertial sensors and method of acquiring thereof are known, and they are omitted herein for brevity.

Step S25 is generating the consolidated data flow; in this step, the data acquired in Step S23 is merged with data acquired in Step S24 so as to form a consolidated data flow, an example of which is shown in FIG. 4.

Step S26 is transmitting the consolidated data flow to the host 6 for further processing.

Figure 19:
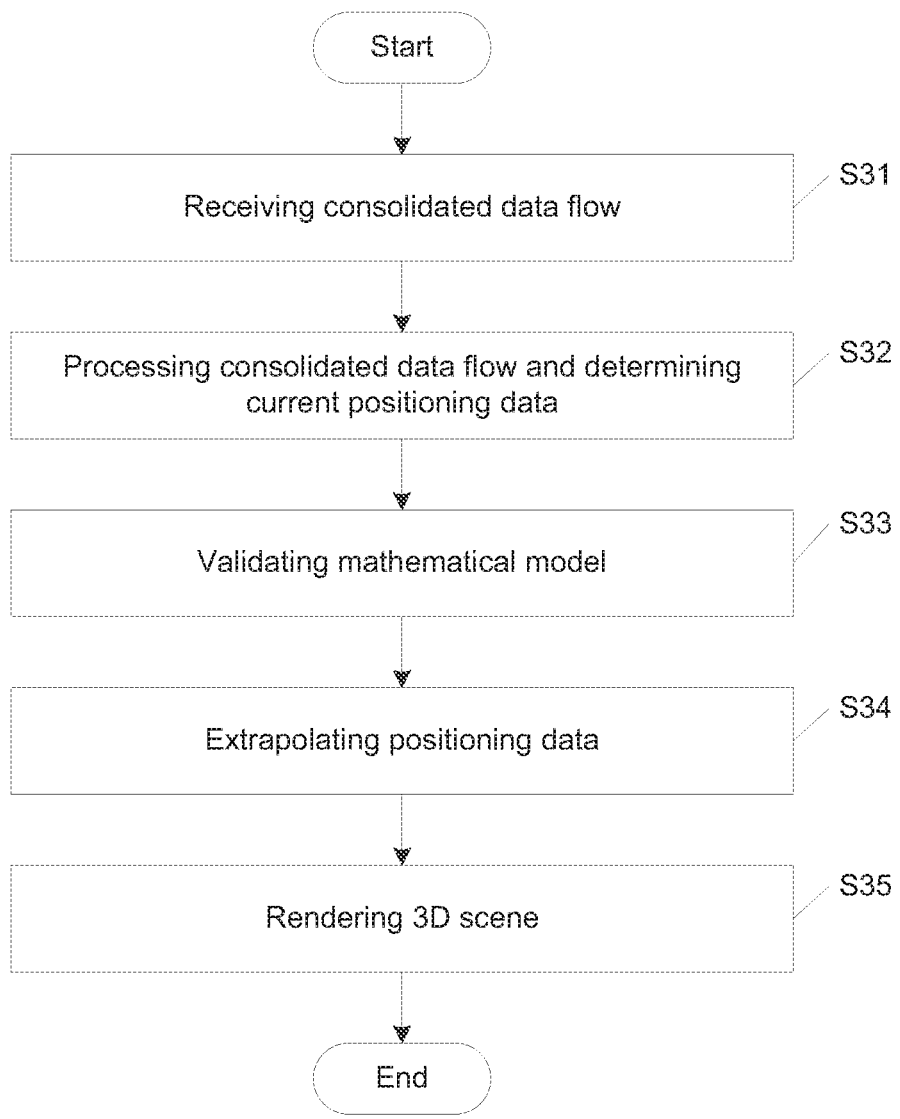
FIG. 19 shows a flowchart of an algorithm illustrating a procedure of acquiring and processing data in a host.

Step S3 includes a number of steps (FIG. 19).

Step S31 is receiving the consolidated data flow; in this step, the host 6 receives the consolidated data flow from the tracker 10; if the trackers 10, 20, 30 are pooled into a group and data of trackers 20, 30 is transmitted through the tracker 10, then in this step, the host 6 also splits the consolidated data flows received through the tracker 10 into separate consolidated data flows of the tracker 10, the tracker 20 and the tracker 30, which are further processed independently from each other.

Step S32 is processing the consolidated data flow; in this step, the host 6 processes data contained in the consolidated data flow from the tracker 10 and determines current positioning data (position coordinates, orientation and, optionally, motion parameters) in the operational area coordinate system of the system 1; the consolidated data flow processing algorithm is further set forth in detail with reference to FIG. 22.

Step S33 is validating a mathematical model of the tracker motion path; the mathematical model validation algorithm is further described in detail with reference to FIG. 23.

Step S34 is extrapolating the positioning data; in this step, predicted position and orientation of the tracker in the operational area coordinate system of the system 1 in a certain future time point within a set extrapolation horizon is determined; the extrapolation algorithm is further described in detail with reference to FIG. 24.

Step S34 is 3D scene rendering; in this step, the system 1 forms 3D scenes for each eye of each user 7, based on the current and predicted position and orientation data of each tracker.

Depending on purpose of the VR/AR system 1 and depending on the number of users, 3D scene rendering for each user in step S35 may be performed in a centralized manner by a central host having a large calculation capacity, and afterwards the 3D scene may be transmitted to a corresponding user, or 3D scene rendering for each user may be performed in a decentralized manner by a local host placed on the user's body, e.g., in the HMD 5. A range of interim solutions is also possible, where these solutions contemplate presence of both the central host and the local hosts and differ in function distribution and, correspondingly, in calculation load distribution over the central host and the local hosts.

In step S32, current positioning data is determined, namely, coordinates, orientation and, optionally, tracker motion parameters in a coordinate system of the operational area of the system 1 are calculated. During operations of the system 1, a set of historic tracking data acquired from all sensors within a predefined time span is accumulated. In particular, within a time span of four seconds, which tends to be optimal for most of game applications, the historic data includes information of approximately 17000 data updates of sensors. The historic data is stored in the storage device 62 of the host 6. The historic data allows determining a motion path of a tracker and a corresponding user body part in the past within a predefined time span and predicting the future motion path within an extrapolation horizon.

Figure 20:
FIG. 20 shows a diagram illustrating a positioning data update concept.

FIG. 20 shows a diagram illustrating a positioning data update concept. Data $OF_0$ is a current optical positioning data acquired on a basis of the optical sensor data. Data $L_0$ is a current inertial positioning data acquired on a basis of the inertial sensors data after acquiring data $OF_1$. Data $OF_1$ is a previous optical positioning data acquired on a basis of the optical sensor data. Data $L_1$ is a previous inertial positioning data acquired on a basis of the inertial sensor data between data $OF_0$ and data $OF_1$. Data $OF_n$, $OF_{n-1}$, $OF_{n-2}$, . . . , $OF_2$ denote older optical positioning data related to a predefined time span, and data $L_n$, $L_{n-1}$, $L_{n-2}$, $L_2$ denote corresponding older inertial positioning data. A collection of the optical positioning data related to a predefined time span and the inertial positioning data corresponding to the optical positioning data jointly form a set of historic tracking data.

Figure 21:
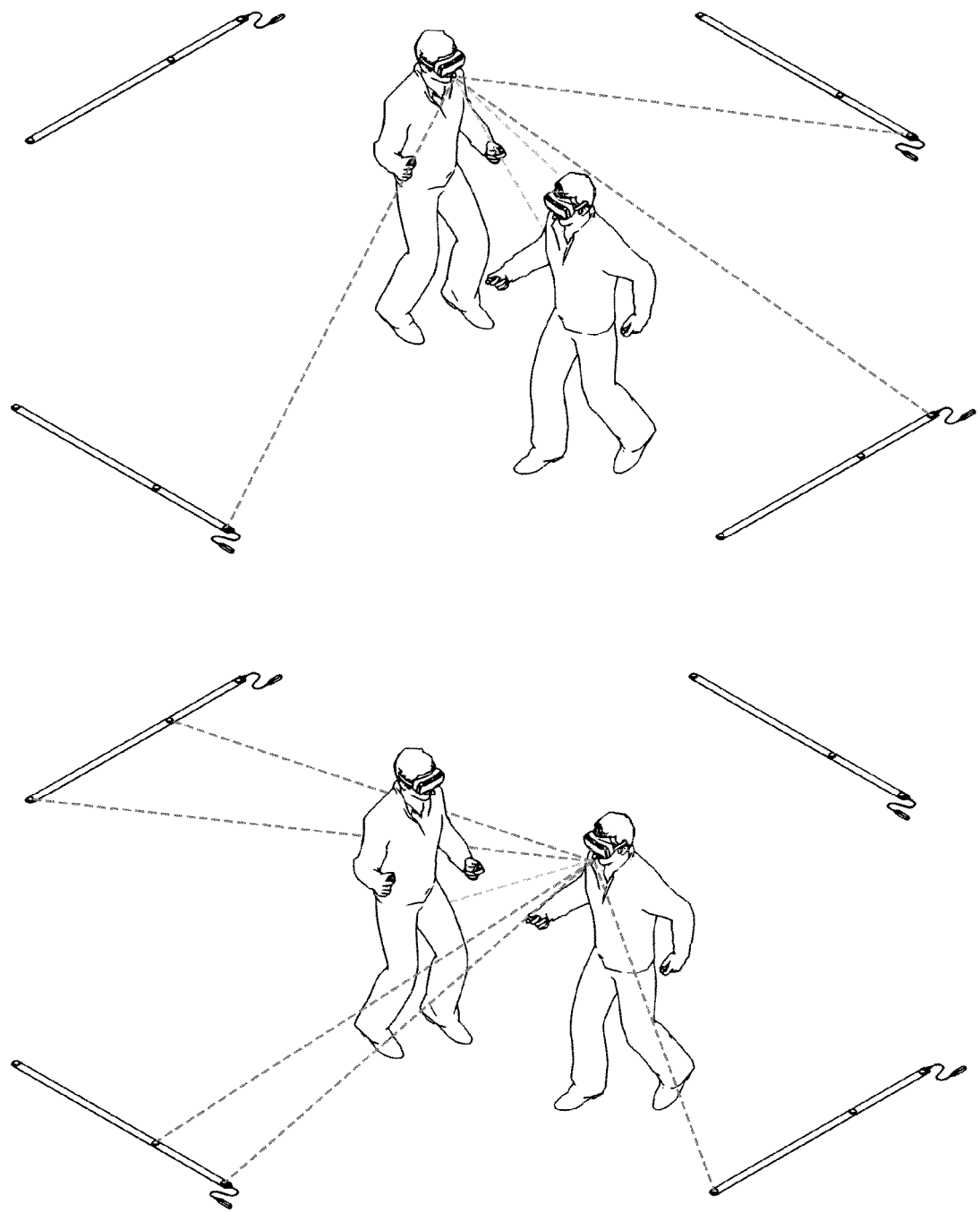
FIG. 21 shows an example of shading markers in a multi-user VR/AR system.

Data OF includes information on rays in local coordinate system of each tracker, where the rays are directed to the marker blobs, which are feature points detected in an optical frame. A certain feature point corresponds to each ray. A number of the feature points detected by each tracker tends to change in time and depends on mutual position of the tracker and marker strips and on shading the markers by users in multi-user VR/AR systems (FIG. 21). The update rate of data OF may be in a range of 60 to 400 samples per second, depending on operation mode of the optical sensor.

Data L includes accelerometer and gyroscope data sequences describing motion of a tracker during time spans between arrivals of data OF. A current set of data $L_0$ is updated upon receiving new data from the gyroscope and the accelerometer, and an update rate of data L may be in a range of 2000 to 4000 samples per second, given that a non-synchronized arrival of each of the gyroscope data and the accelerometer data is about 2000 samples per second. Note that the update rate of data L may be less than 2000 samples per second or more than 4000 samples per second, depending on used types of the inertial sensors; it is important that the update rate of data L be substantially higher than the update rate of data OF.

A set of tracker positioning data S is a multidimensional vector; in an illustrative embodiment of the invention, it includes tracker coordinates in a form of a global 3D vector (in a coordinate system of the operational area of the VR/AR system), tracker orientation in a form of a global quaternion (in a coordinate system of the operational area of the VR/AR system), motion speed in a form of a global 3D vector (in a coordinate system of the operational area of the VR/AR system) and data correction value(s) for one or more inertial sensors in a form of a local 3D vector (in a coordinate system of the tracker). In an illustrative embodiment of the invention, the set of tracker positioning data S includes 13 parameters, where 12 parameters are independent (the quaternion describing the tracker position includes one redundant parameter). In another embodiment of the invention, the set of tracker positioning data S may include more or less parameters, in particular, tracker motion speed data may be omitted in the set of tracker positioning data S, or the set of tracker positioning data S may include a tracker acceleration data, in addition to the tracker motion speed data.

Usually, the system stores the set of tracker positioning data S only for a time point corresponding to the latest optical frame (i.e., the most recent position passed verification and validation, based on the optical data). Positioning data for other time points within the history records depth is calculated by way of addition or subtraction of increments/decrements corresponding to the inertial data L.

In particular, during a forward pass, i.e., when S is rolling in a positive time axis direction, historic values of data $S_i$ are calculated by way of correcting data $S_{i+1}$ using data $L_{i+1}$, where i=0 . . . n, and the correction is performed by adding coordinate values. During a backward pass, i.e., when S is rolling in a negative time axis direction, the historic values of data $S_i$ are calculated by way of correcting data $S_{i-1}$ using data $L_i$, where i=0 . . . n, and the correction is performed by subtracting the coordinate values (FIG. 20). In other words, the set of positioning data S may be determined for the current time point and for any time point in the past within the history records depth (usually about 4 seconds), where time accuracy of the determination corresponds to an inertial data arrival rate.

Position and orientation of the tracker at a predefined time point (and, therefore, a motion path of the tracker) may be determined, based on data S and data L. In other words, the set of data S and data L constitutes a mathematical model of the tracker motion path, which changes upon any arrival of new data from any sensor and which is used for prediction of the tracker position at a predefined future time point by an extrapolation algorithm. Verification (recalculation) of the mathematical model related to data S is performed upon arrival of new optical data, while a register of data L is updated upon arrival of new inertial data. If new optical data arrives before a validation procedure based on earlier optical data is complete, then the next validation procedure will start as soon as the previous validation procedure is complete, and the newly arrived optical data is used therein.

During validation of the mathematical model, deviations of the tracker motion path from reference points of the tracker positions known from the optical data are calculated. After optimization of the motion path (i.e., after verification of the mathematical model), the deviations are calculated again. A comparison result for these deviations allows deciding on whether the model prior to change is still valid or it should be replaced by a changed model. Note that given the content of the set of data S and the set of data L, it is enough to optimize only the vector S so as to update the entire motion path, and all other points of the motion path may be calculated, using increments/decrements, based on the inertial data L.

Position and orientation of the tracker at a predefined future time point corresponding to the extrapolation horizon may be predicted, based on the validated mathematical model. Algorithms of the mathematical model validation and positioning data extrapolation are further discussed in detail with reference to FIG. 23 and FIG. 24.

Figure 22:
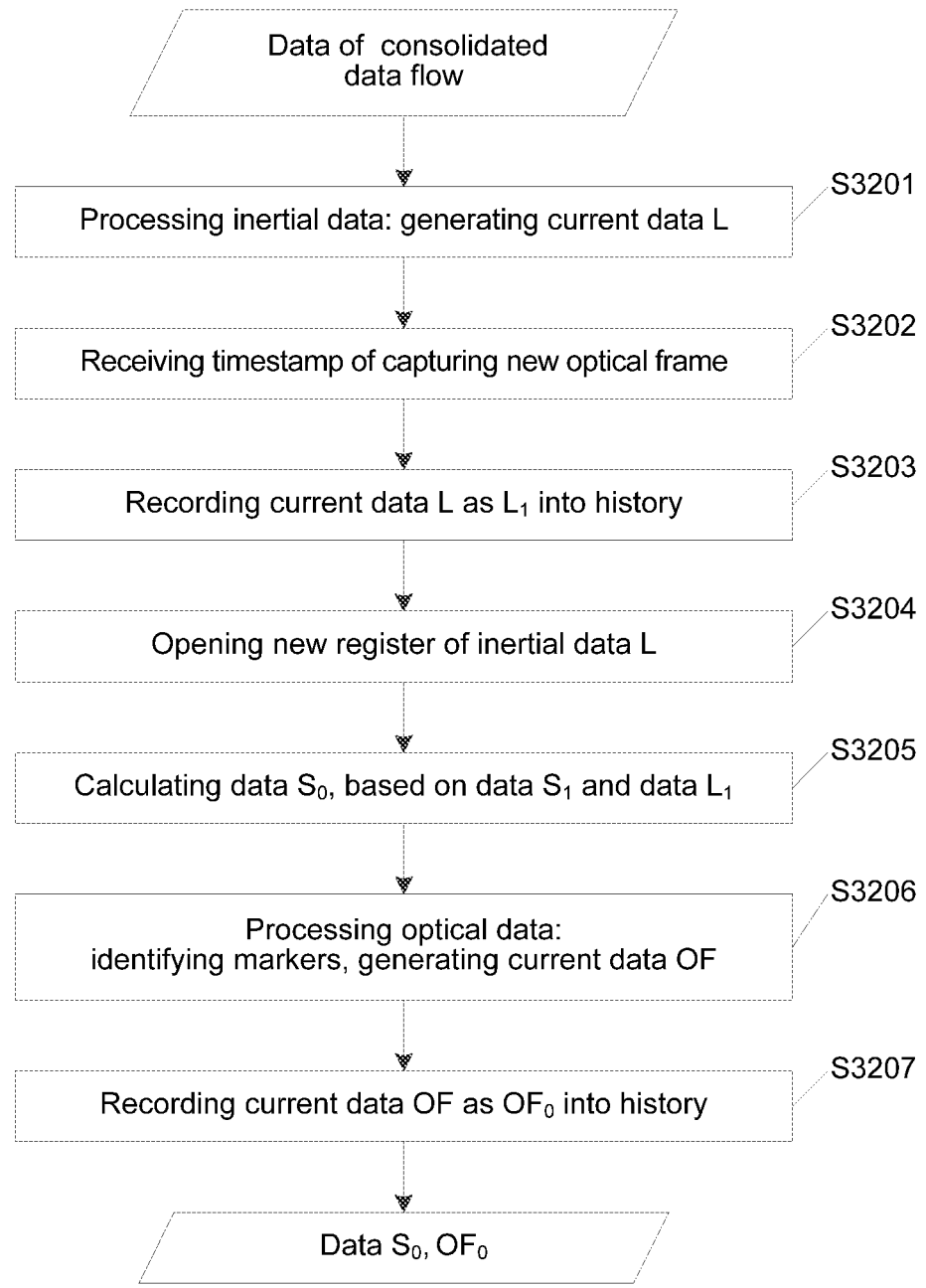
FIG. 22 shows a flowchart of an algorithm illustrating a procedure of processing data of a consolidated data flow.

FIG. 22 shows a flowchart of an algorithm of processing the consolidated data flow in step S32.

Input data of the algorithm is data of the consolidated data flow from a tracker, acquired in step S31.

Step S3201 is processing data of inertial sensors, in particular, a gyroscope and an accelerometer, and the step results in adding new inertial data into a register of inertial data L of the tracker. When a timestamp indicating a time point of capturing a corresponding frame is arrived with the consolidated data flow in step S3202, a current inertial data register is closed and data therefrom is recorded as data $L_1$ into a stack of inertial data in step S3203, and a new register is opened for receiving new inertial data, where enumeration of the optical and inertial data in the stack is shifted one step back in step S3204.

Step S3205 is calculating a set of current positioning data of the tracker, i.e., data $S_0$, by way of application of data $L_1$ for correcting data $S_1$. In particular, coordinates values of data $S_1$ are summed with increment values of data $L_1$.

Step S3206 is processing optical data, which is 2D coordinates of detected marker blobs in a coordinate system of the optical sensor frame, where marker identification is performed, i.e., it is determined which marker strip each marker belongs to. Marker identification is performed, based on optical patterns corresponding to the marker strips. In particular, a linear optical pattern is used in the marker strip 4 (FIG. 10), where a distance between markers 40 and 41 is twice as much as a distance between markers 41 and 42. A direction (a ray) to each marker detected and identified in data of a tracker is calculated in a coordinate system of this tracker. This direction may be determined in polar coordinates. A plurality of rays constitutes a set of data OF of this tracker, which is recorded as data $OF_0$ in step S3207.

Thus, step S32 results in data $S_0$ and data $OF_0$.

Figure 23:
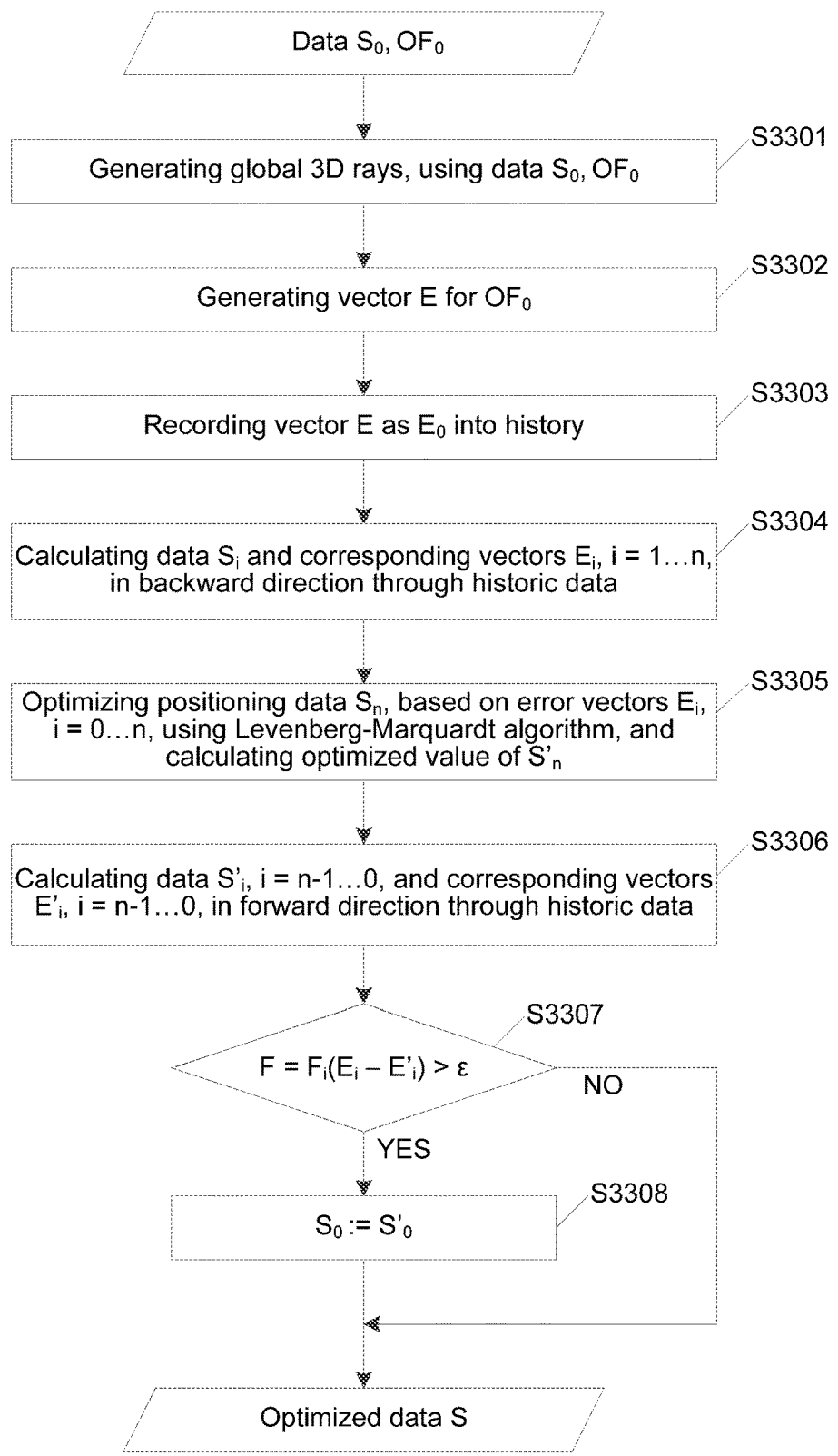
FIG. 23 shows a flowchart of an algorithm illustrating a procedure of validating a mathematical model of a tracker motion path.

FIG. 23 shows a flowchart of an algorithm of validating a mathematical model of a tracker motion path in step S33.

Step S3301 is generating global 3D rays, based on local 2D rays directed to markers visible by a tracker, using information contained in current data $S_0$. Transformation of 3D rays determined in local coordinates of a certain tracker into 3D rays determined in global coordinates of a VR/AR system is necessary for further determination of a tracker position error vector E.

Step S3302 is calculating a tracker position error vector E, which is a multidimensional vector and which includes residuals of the marker coordinates and partial derivatives of the residuals related to each component of the set of data $S_0$. The residual of the marker coordinates is determined by way of comparison of the marker coordinates calculated, based on the 3D rays generated in step S3301, and the marker coordinates known from a layout of the marker strips.

Step S3303 is recording the calculated current vector E into a stack of error vectors E as vector $E_0$.

Step S3304 is calculating data S and corresponding error vectors E in a backward direction through entire depth of the historic tracking data, where data $S_0$ values (i.e., the most recent values received in step S3203) are used as initial data S values, and historic data S values are calculated by applying corresponding historic data L values, as it was discussed in the above for the backward pass case. In other words, data $S_i$ corresponding to time points of data $OF_i$ is calculated; vectors $E_i$ corresponding to time points of data $OF_i$, i=0 . . . n, are also calculated, and values of vectors $E_i$ are recorded into the stack of error vectors E.

When the earliest time point of the history is reached, the set of positioning data $S_n$ is optimized in step S3305. The optimization may be performed by a least square method, e.g., using a Levenberg-Marquardt algorithm. Other optimization methods may be used instead, which are well-known. Input data for the optimization is vectors E calculated in step S3304, while partial derivatives contained in the vectors E define a direction of changing data S during the optimization. Step S3305 results in a set of optimized data $S'_n$.

Step S3306 is calculating data S' in a forward direction, where data $S'_n$ values (i.e., the most aged values received in step S3205) are used as initial data S' values, and historic data S' values are calculated by applying corresponding historic data L values, as discussed above for the forward pass case. This process results in data $S'_i$, i=0 . . . n, denoting a changed tracker motion path, and in vectors $E'_i$, $i=0 \ldots n$, which are calculated for new values of $S'_t$, which are recorded into a stack of error vectors $E'$.

Step S3307 is comparing vectors of stacks of vectors $E'$ and $E$ so as to determine if a positioning error is reduced, when the changed mathematical model is compared with the current mathematical model. This comparison may be done element-wise for each couple of vectors $E_i$ and $E'_i$ (i.e., corresponding components of the multidimensional vectors contained in the vector stacks $E_i$ and $E'_i$ may be compared), where a target function $F=F_i(E_i-E'_i)$, $i=n \ldots 0$, may be calculated and its value may be compared with a threshold value $\varepsilon$. If $F>\varepsilon$, the new set of data $S'_0$ is accepted as $S_0$ in step S3308, i.e., the changed mathematical model will further be used in the VR/AR system, and if $F\leq\varepsilon$, the current set of data $S_0$ remains valid, i.e., the current mathematical model will further be used in the VR/AR system; the current mathematical model is considered valid until new optical positioning data is received.

The target function F may be a weighting function. In particular, the target function may consider a size of a marker blob (larger marker blobs provide a less noisy data, so their contribution to the weighting function may be higher), a position of marker blob in an array of an optical sensor (marker blobs located close to the geometric center of the optical sensor, especially, when the optical sensor is equipped with a wide-angle fisheye-type lens, provide a less geometrically distorted data, so their contribution to the weighting function may be higher), and/or the data age (components of the vector E related to the current time point may contribute more to the weighting function, compared with historic components of the vector E).

Thus, step S33 results in optimized data S, which provides minimal tracker positioning error.

The step S33 algorithm is launched each time, when new optical data is received in the consolidated data flow. When that happens, the most aged historic values of data OF and data L are deleted from the stack by a FIFO rule, i.e., data OF and data L are shifted by one step in a direction of more recent positioning data.

The above-discussed algorithm provides the following advantages:

(a) a high diversity; arrival of any sensor data allows adjusting position and orientation of a tracker, namely, arrival of new optical data allows verification of the mathematical model of the tracker motion path, and arrival of new inertial data ensures a high precision of tracking in between the optical data arrivals;

(b) a high robustness; even if an optical data related to one marker only is arrived (this may be caused by marker shading by users in a multiuser system, and such data cannot be directly used for positioning a tracker), the optical data may still be used for verification of the mathematical model.

Maintaining a valid mathematical model of the tracker motion path allows precise prediction of the tracker position in a predefined future time point. The prediction is done using an extrapolation algorithm.

Figure 24:
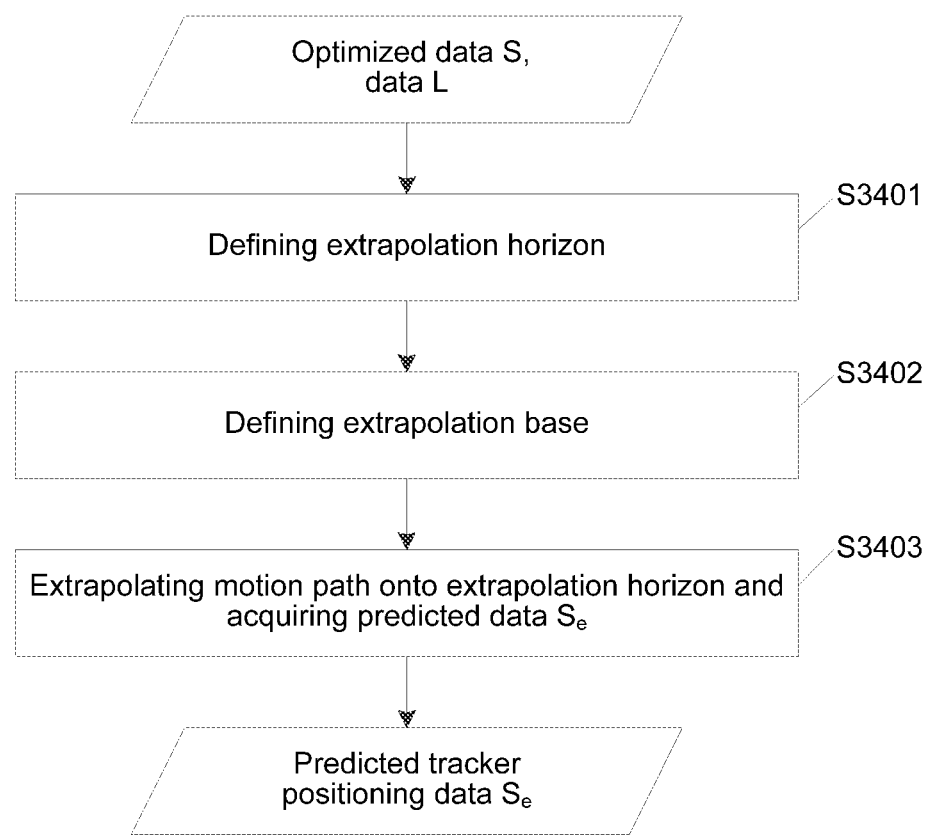
FIG. 24 shows a flowchart of an algorithm illustrating a procedure of extrapolating a positioning data.

FIG. 24 shows a flowchart of a positioning data extrapolation algorithm performed in step S34. Input data for this algorithm is the optimized data S acquired in step S33 and the set of data L.

Step S3401 is defining an extrapolation horizon. The extrapolation horizon is defined according to a request from a 3D engine, which renders a 3D scene. The 3D engine requests positioning data for a certain future time point corresponding to a time point of outputting the 3D scene to a HMD, based on particular parameters of a VR/AR system, namely, its purpose, number of users, typical user's dynamism, user's movement manner, known delay in the system, etc. The extrapolation horizon range may be set to zero, e.g., when the 3D engine does not request predicted positioning data. The extrapolation horizon range may also be defined by limitations set in the VR/AR system settings. The inventor has determined by trial that the extrapolation horizon range should not exceed 30 ms, if an inertial sensor update rate is 4000 samples per second and maximum age of any data is within 4 seconds, in order to maintain a high credibility of prediction for the tracker position and orientation.

Step S3402 is defining an extrapolation base, which is a history depth of data L; the extrapolation base is used by an extrapolation algorithm for development of the predicted tracker motion path within an uncertainty span, i.e., between a time point of arrival of latest inertial data and a time point corresponding to the extrapolation horizon. The extrapolation base may be set within total tracking history (e.g., within about 4 seconds). The extrapolation base value may be set, depending on available computational capacity, a number of traced trackers in the VR/AR system, etc. In some cases, optimization of data S allows maintaining acceptable extrapolation accuracy even with a minimal extrapolation base having one or a few samples of data L. Note that the extrapolation base may be defined dynamically, i.e., it may vary, depending on a current situation in the VR/AR system; it may also be different for different trackers.

Step S3403 is extrapolating a motion path onto the extrapolation horizon defined in step S3401, based on the extrapolation base defined in step S3402. In other words, the motion path is completed up to the future time point defined by the request received from the 3D engine. The most recent data $L_0$ is applied to data $S_0$ and the obtained result is processed with an extrapolation algorithm so as to calculate physical coordinates of a tracker on the extrapolation horizon.

Depending on purpose of a VR/AR system and computational capabilities thereof, various extrapolation algorithms may be used for development of the predicted tracker motion path; these algorithms are known to artisans, so their detailed description is omitted for brevity. Extrapolation algorithms may differ for different trackers and even the algorithms are the same, their extrapolation parameters may be different.

Thus, step S34 results in predicted position and orientation data $S_e$ of a tracker within the operational area.

Note that each of the processes corresponding to steps S31, S32, S33, S34 is performed in respect of data of each tracker independently, i.e., these processes are multi-stream processes and a number of the streams is divisible by the number of trackers in a VR/AR system.

Note that the above discussion covers those actions that are most important for attaining the purpose of the invention. It shall be apparent to those skilled in the art that other actions shall also be done so as to ensure operations of the system, e.g., connecting equipment, its initialization, launching appropriate software, transmitting and receiving instructions and acknowledgements, ancillary data exchanging, synchronizing, etc., and their description is omitted herein for brevity.

Note that the above discussion covers those device components that are most important for attaining the purpose of the invention. It shall be apparent to those skilled in the art that these devices must or may include other parts or portions so as to ensure operations of the system, and their description is omitted herein for brevity.

Devices and their component parts, methods and their steps mentioned in the description and shown in the drawings relate to one or more particular embodiments of the invention, when they are mentioned with reference to a numeral designator, or they relate to all applicable embodiments of the invention, when they are mentioned without reference to a numeral designator.

Devices and their parts mentioned in the description, drawings and claims constitute combined hardware/software means, where hardware of some devices may be different, or may coincide partially or fully with hardware of other devices, if otherwise is not explicitly stated. The hardware of some devices may be located in different parts of other devices, if otherwise is not explicitly stated. The software content may be implemented in a form of a computer code contained in a storage device.

Sequence of steps in the method description provided herein is illustrative and it may be different in some embodiments of the invention, as long as the function is maintained and the result is attained.

Parts/components and features of the invention may be combined in different embodiments of the invention, if they do not contradict to each other. The embodiments of the invention discussed in the above are provided as illustrations only and they are not intended to limit the invention, which is defined in claims. All and any reasonable modifications, alterations and equivalent replacements in design, configuration, and mode of operation corresponding to the invention gist are included into the scope of the invention.

Note that the above description relates to using the method and/or the system for inside-out optical-inertial tracking of a movable object in virtual reality or augmented reality systems, while the method and/or the system are fully applicable in any other industry for solving problems of determination position and/or orientation and/or motion parameters of a movable object.

In particular, the above-discussed engineering solutions may be advantageously employed for tracing cargos and operators in factory logistics, warehouse logistics or store logistics systems, for tracing motions of participants in educational or training systems, for determining position and orientation of endpoints in robotics systems, for handling unmanned movable objects, including unmanned aircrafts, and for accomplishing various tasks in other systems, including those currently existing and possibly upcoming in the future.

REFERENCES TO NON-PATENT DOCUMENTS

1. A. Hogue; M. R. Jenkin; R. S. Allison, *An optical-inertial tracking system for fully-enclosed VR displays* (2008), DOI: 10.1109/CCCRV.2004.1301417 (https://doi.org/10.1109/CCCRV.2004.1301417)
2. D. Wormell; E. Foxlin; P. Katzman, *Advanced inertial-optical tracking system for wide area mixed and augmented reality systems*, Proceedings of the 10th International Immersive Projection Technologies Workshop (2007).
3. Robert Atac; Eric Foxlin, *Scorpion hybrid optical-based inertial tracker* (HObIT) (2013), DOI: 10.1117/12.2012194 (http://dx.doi.org/10.1117/12.2012194)
4. Robert Atac; Scott Spink; Tom Calloway; Eric Foxlin, *Scorpion hybrid optical-based inertial tracker* (HObIT) Test Results (2014), DOI: 10.1117/12.2050363 (http://dx.doi.org/10.1117/12.2050363)
5. Axel Pinz; Markus Brandner; Harald Ganster; Albert Kusej; Peter Lang; Miguel Ribo, *Hybrid Tracking for Augmented Reality* (2002), ÖGAI Journal, 21:1 17-24 (2002).
6. Suya You; Ulrich Neumann; Ronald Azuma, *Hybrid Inertial and Vision Tracking for Augmented Reality Registration* (1999), Proceeding VR'99 Proceedings of the IEEE Virtual Reality, Page 260.
7. Markus Miezal; Gabriele Bleser; Didier Stricker; Johannes Tumler, *Towards practical inside-out head tracking for mobile seating bucks* (2012). ISMAR 2012 Workshop on Tracking Methods and Applications (ISMAR-12), November 5-8, Atlanta, Ga., USA.
8. John Carmack, *Latency Mitigation Strategies*, (https://web.archive.org/web/20140719085135/http://www.alt-dev.co/2013/02/22/latency-mitigation-strategies)
9. Michael Abrash, *Latency—the sine qua non of AR and VR*, (http://blogs.valvesoftware.com/abrash/latency-the-sine-qua-non-of-ar-and-vr)

The invention claimed is:

1. A method of optical-inertial tracking a movable object, comprising the steps of:
   (a) providing emission of IR light by a plurality of markers fixedly mounted so as to be visible from the movable object in order to perform inside-out tracking;
   (b) reading a picture, by a first data processing device, from an optical sensor that is mounted on the movable object and detecting pixels satisfying predefined conditions in the read picture;
   (c) detecting marker blobs, based on the detected pixels, and determining parameters of the marker blobs by the first data processing device;
   (d) reading data, by the first data processing device, from at least one inertial sensor that is mounted on the movable object;
   (e) generating, by the first data processing device, a consolidated data flow comprising the parameters of the marker blobs and the data from the at least one inertial sensor, and transmitting the consolidated data flow by a first communication device to a second communication device;
   (f) receiving the consolidated data flow by the second communication device and determining, by a second data processing device, a tracker positioning data in a coordinate system of a motion area of the movable object, based on the consolidated data flow;
   (g) validating, by the second data processing device, a mathematical model of a tracker motion path, based on the tracker positioning data; and
   (h) extrapolating, by the second data processing device, the tracker positioning data onto an extrapolation horizon, based on the validated mathematical model of the tracker motion path.

2. The method of claim 1, wherein the picture from the optical sensor in step (b) is read form a portion of the optical sensor, wherein a size of the portion is smaller than an entire frame size of the optical sensor.

3. The method of claim 2, wherein the portion to be read is a tracing window.

4. The method of claim 1, wherein the predefined conditions in step (b) include threshold values of brightness of the pixels.

5. The method of claim 4, wherein the predefined conditions include a requirement related to aggregation of the pixels.

6. The method of claim 1, wherein detecting the pixels satisfying the predefined conditions in step (b) is started before an end of reading of the picture from the optical sensor.

7. The method of claim 1, wherein step (b) is performed by an FPGA.

8. The method of claim 1, wherein the parameters of each of the marker blobs in step (c) include coordinates of its center in a coordinate system of a frame of the optical sensor, an effective radius and a weighted brightness.

9. The method of claim 8, wherein the coordinates of the center are determined with a subpixel accuracy.

10. The method of claim 8, wherein the parameters of the marker blob include a timestamp indicating time when a frame was captured.

11. The method of claim 1, wherein step (c) is performed by a microcontroller.

12. The method of claim 1, wherein the inertial sensor in step (d) is a gyroscope.

13. The method of claim 1, wherein the inertial sensor in step (d) is an accelerometer.

14. The method of claim 1, wherein the data read from the inertial sensor in step (d) includes a timestamp indicating a time when the data was read.

15. The method of claim 1, wherein the consolidated data flow generated in step (e) includes data of multiple trackers.

16. The method of claim 15, wherein the consolidated data flow in step (f) is divided into multiple consolidated data flows, whose number corresponds to a number of the trackers.

17. The method of claim 1, wherein the first data processing device and the first communication device are located in the tracker, and the second data processing device and the second communication device are located in a host.

18. The method of claim 17, wherein the tracker is combined with the host.

19. The method of claim 1, wherein the markers are identified based on the parameters of the marker blobs, so as to determine the tracker positioning data in step (f).

20. The method of claim 19, wherein the identification of the markers is performed using a predefined optical pattern.

21. The method of claim 20, wherein the optical pattern is a linear optical pattern.

22. The method of claim 21, wherein the linear optical pattern includes blobs corresponding to a group of three markers aligned in a line, wherein a distance between a first marker and a second marker is twice as much as a distance between the second marker and a third marker.

23. The method of claim 1, wherein a set of historic tracking data is generated, based on the tracker positioning data determined in step (f) for different time points.

24. The method of claim 23, wherein the validation of the mathematical model of the tracker motion path in step (g) is performed using the set of historic tracking data.

25. The method of claim 24, wherein the set of historic tracking data includes a set of data S comprising a multi-dimensional vector that characterizes position and orientation of the tracker, and a set of data L comprising data of one or more inertial sensors.

26. The method of claim 25, wherein the set of historic tracking data includes a set of data OF comprising information on rays in a local coordinate system of the tracker, the rays directed to the markers, whose blobs were detected in step (c).

27. The method of claim 26, wherein the validation of the mathematical model of the tracker motion path in step (g) includes calculating the data S in a backward direction through an entire depth of the historic tracking data, optimizing the data S in an earliest time point of the history, and then calculating an optimized data S in a forward direction through the entire depth of the historic tracking data.

28. The method of claim 27, wherein a vector E of the tracker positioning error is calculated by comparison of the marker coordinates and based on the data OF and predetermined actual marker coordinates, in a backward direction through entire depth of the historic tracking data, and the optimization of the data S in the earliest time point of the history is performed, using the vector E of the tracker positioning error.

29. The method of claim 28, wherein the marker coordinates that are calculated based on the data OF are polar coordinates.

30. The method of claim 28, wherein the optimization of the data S in the earliest point of the history is performed using a least squares method.

31. The method of claim 30, wherein the optimization of the data S in the earliest point of the history is performed, using a Levenberg-Marquardt algorithm.

32. The method of claim 28, wherein the vector E of the tracker positioning error is calculated in a forward direction through entire depth of the historic tracking data, and the validation of the mathematical model of the tracker motion path is performed by comparing the vectors E of the tracker positioning error calculated in the forward direction and the vectors E of the tracker positioning error calculated in the backward direction, and by further calculating a target function used for judging relevance of the mathematical model of the tracker motion path.

33. The method of claim 32, wherein the target function is a weighting function.

34. The method of claim 32, wherein the validation of the mathematical model of the tracker motion path results in the optimized data S, which ensures minimal error of the tracker positioning.

35. The method of claim 1, wherein the determination of the tracker positioning data in step (f) is performed each time new data of the at least one inertial sensor is received in the consolidated data flow.

36. The method of claim 1, wherein the validation of the mathematical model of the tracker motion path in step (g) is performed each time new parameters of the marker blobs are received in the consolidated data flow.

37. The method of claim 1, wherein the extrapolation of the tracker positioning data in step (h) is performed by defining an extrapolation horizon and an extrapolation base, and by further extrapolating the tracker motion path onto the extrapolation horizon.

38. The method of claim 37, wherein the extrapolation horizon is defined based on data received from a 3D-engine that renders a 3D-scene.

39. The method of claim 1, further comprising rendering a 3D-scene based on the extrapolated tracker positioning data, and outputting the 3D-scene into a head-mounted display of a user in a VR/AR system.

40. A system for optical-inertial tracking a movable object, the system comprising:
at least one plurality of markers fixedly mounted so as to be visible from the movable object in order to perform inside-out tracking, including IR light emitting markers;
at least one tracker mounted on the movable object, and including an optical sensor, at least one inertial sensor, a first data processing device and a first communication device, wherein the tracker is configured to
  read, by the first data processing device, a picture from the optical sensor,
  detect, by the first data processing device, pixels satisfying predefined conditions in the read picture,
  detect, by the first data processing device, marker blobs based on the detected pixels, to determine, by the first data processing device, parameters of the marker blobs,
  read, by the first data processing device, data from the at least one inertial sensor,
  generate, by the first data processing device, a consolidated data flow including the parameters of the marker blobs and the data of the at least one inertial sensor, and
  transmit, by the first communication device, the consolidated data flow to a host;
at least one host comprising a second communication device and a second data processing device,
wherein the host is configured to
  receive, by the second communication device, the consolidated data flow,
  determine, by the second data processing device, a tracker positioning data in a coordinate system of a motion area of the movable object, based on the consolidated data flow,
  validate, by the second data processing device, a mathematical model of a tracker motion path, based on the tracker positioning data, and
  extrapolate, by the second data processing device, the tracker positioning data onto an extrapolation horizon, based on the validated mathematical model of the tracker motion path.

41. The system of claim 40, wherein the first data processing device is configured to read the picture from a portion of the optical sensor, wherein the portion is smaller than an entire frame size of the optical sensor.

42. The system of claim 41, wherein the portion is a tracing window.

43. The system of claim 40, wherein the predefined conditions include a threshold value of brightness of the pixel.

44. The system of claim 43, wherein the predefined conditions include a requirement related to aggregation of the pixels.

45. The system of claim 40, wherein the first data processing device is configured to start detecting pixels satisfying the predefined conditions before reading the picture from the optical sensor is finished.

46. The system of claim 40, wherein the first data processing device includes an FPGA configured to read the picture from the optical sensor and detect pixels satisfying the predefined conditions in the read picture.

47. The system of claim 40, wherein the parameters of each of the marker blobs include coordinates of its center in a coordinate system of a frame of the optical sensor, an effective radius and a weighted brightness.

48. The system of claim 47, wherein the first data processing device is configured to determine the coordinates of the center with a subpixel accuracy.

49. The system of claim 47, wherein the parameters of the marker blob include a timestamp indicating a time when an appropriate frame was captured.

50. The system of claim 40, wherein the first data processing device includes a microcontroller configured to detect the marker blobs, based on the detected pixels, and to determine parameters of the marker blobs.

51. The system of claim 40, wherein the inertial sensor is a gyroscope.

52. The system of claim 40, wherein the inertial sensor is an accelerometer.

53. The system of claim 40, wherein the data read from the inertial sensor includes a timestamp indicating a time when the data was read.

54. The system of claim 40, wherein the consolidated data flow includes data of multiple trackers.

55. The system of claim 54, wherein the second data processing device is configured to divide the consolidated data flow into multiple consolidated data flows whose number corresponds to a number of the trackers.

56. The system of claim 40, wherein the tracker is combined with the host.

57. The system of claim 40, wherein the second data processing device is configured to identify the markers, based on the parameters of the marker blobs, so as to determine the tracker positioning data.

58. The system of claim 57, wherein the second data processing device is configured to identify the markers using a predefined optical pattern.

59. The system of claim 58, wherein the predefined optical pattern is a linear optical pattern.

60. The system of claim 59, wherein the linear optical pattern includes blobs corresponding to a group of three markers aligned in a line, wherein a distance between a first marker and a second marker is twice a distance between the second marker and a third marker.

61. The system of claim 40, wherein the second data processing device is configured to generate a set of historic tracking data based on the tracker positioning data determined for different time points.

62. The system of claim 61, wherein the second data processing device is configured to validate the mathematical model of the tracker motion path using the set of historic tracking data.

63. The system of claim 62, wherein the set of historic tracking data includes a set of data S comprising a multi-dimensional vector characterizing position and orientation of the tracker, and a set of data L including data of one or more inertial sensors, wherein the data S and the data L correspond to parameters of the mathematical model of the tracker motion path.

64. The system of claim 63, wherein the set of historical tracking data includes a set of data OF comprising information on rays in a local coordinate system of the tracker, the rays directed to the markers, which blobs were detected.

65. The system of claim 64, wherein the second data processing device is configured to calculate the data S in a backward direction through entire depth of the historic tracking data, optimize the data S in an earliest time point of the history, and then calculate an optimized data S in a forward direction through the entire depth of the historic tracking data during the validation of the mathematical model of the tracker motion path.

66. The system of claim 64, wherein the second data processing device is configured to calculate a vector E of the tracker positioning error, which is determined by comparison of the marker coordinates calculated, based on the data OF, and predetermined actual marker coordinates, in a backward direction through an entire depth of the historic tracking data, and to optimize the data S in an earliest time point of the history, using the vector E of the tracker positioning error.

67. The system of claim 66, wherein the marker coordinates calculated based on the data OF are polar coordinates.

68. The system of claim 66, wherein the optimization of the data S in the earliest time point of the history is performed, using a least squares method.

69. The system of claim 68, wherein the optimization of the data S in the earliest time point of the history is performed, using a Levenberg-Marquardt algorithm.

70. The system of claim 66, wherein the second data processing device is configured to calculate the vector E of the tracker positioning error in a forward direction through entire depth of the historical tracking data, and validate the mathematical model of the tracker motion path by comparing the vectors E of the tracker positioning error calculated in the forward direction and the vectors E of the tracker positioning error calculated in the backward direction, and by further calculating a target function for judging relevance of the mathematical model of the tracker motion path.

71. The system of claim 70, wherein the target function is a weighting function.

72. The system of claim 70, wherein the validation of the mathematical model of the tracker motion path results in the optimized data S, which ensures minimal error of the tracker positioning.

73. The system of claim 40, wherein the second data processing device is configured to determine the tracker positioning data each time, when new data of the at least one inertial sensor is received in the consolidated data flow.

74. The system of claim 40, wherein the second data processing device is configured to validate the mathematical model of the tracker motion path each time new parameters of the marker blobs are received in the consolidated data flow.

75. The system of claim 40, wherein the second data processing device is configured to define an extrapolation horizon and an extrapolation base, and to extrapolate the tracker motion path onto the extrapolation horizon.

76. The system of claim 75, wherein the extrapolation horizon may be defined, based on data received from a 3D-engine configured to render a 3D-scene.

77. The system of claim 40, further comprising at least one head-mounted display configured to present a 3D-scene to a VR/AR system user, wherein the extrapolation of the tracker positioning data is performed so as to further render the 3D-scene, based on the extrapolated tracker positioning data, and to output the 3D-scene into the head-mounted display of the VR/AR system user.

* * * * *